US012320186B2

(12) United States Patent
Ege et al.

(10) Patent No.: US 12,320,186 B2
(45) Date of Patent: *Jun. 3, 2025

(54) DOOR SKIN STACKING

(71) Applicant: Masonite Corporation, Tampa, FL (US)

(72) Inventors: Patrick C. Ege, Westmont, IL (US); Robert C. Allen, Elburn, IL (US); Alan Pepin, Saint Cloud, FL (US)

(73) Assignee: Masonite Corporation, Tampa, FL (US)

( * ) Notice: Subject to any disclaimer, the term of this patent is extended or adjusted under 35 U.S.C. 154(b) by 445 days.

This patent is subject to a terminal disclaimer.

(21) Appl. No.: 17/711,568

(22) Filed: Apr. 1, 2022

(65) Prior Publication Data
US 2022/0220798 A1 Jul. 14, 2022

Related U.S. Application Data

(63) Continuation of application No. 16/379,304, filed on Apr. 9, 2019, now Pat. No. 11,293,213, which is a continuation-in-part of application No. 15/784,306, filed on Oct. 16, 2017, now abandoned.

(51) Int. Cl.
*E06B 3/70* (2006.01)
*B29C 43/02* (2006.01)
*B32B 3/28* (2006.01)
*B44C 5/04* (2006.01)

(52) U.S. Cl.
CPC .......... *E06B 3/7001* (2013.01); *B29C 43/021* (2013.01); *B44C 5/0453* (2013.01); *E06B 2003/7049* (2013.01)

(58) Field of Classification Search
CPC ................. E06B 3/7001; E06B 3/7003; E06B 2003/7049; E06B 2003/7053; B32B 3/28; B32B 3/30
USPC ...................................................... D25/48.3
See application file for complete search history.

(56) References Cited

U.S. PATENT DOCUMENTS

| | | |
|---|---|---|
| 432,504 A | 7/1890 | Amsden |
| 557,148 A | 3/1896 | Rapp |
| 579,696 A | 3/1897 | Carter |
| 619,676 A | 2/1899 | Cronin |
| 926,361 A | 6/1909 | Sjobring |
| 945,224 A | 1/1910 | Dahlstrom |
| 986,013 A | 3/1911 | Klemm |
| 988,574 A | 4/1911 | Jones |
| 1,001,315 A | 8/1911 | Sinclair |
| 1,021,053 A | 3/1912 | Lempera |
| 1,082,071 A | 12/1913 | Danielson |
| 1,086,934 A | 2/1914 | Parish |
| 1,156,950 A | 10/1915 | Wallace et al. |

(Continued)

*Primary Examiner* — Joanna Pleszczynska
(74) *Attorney, Agent, or Firm* — IceMiller LLP

(57) ABSTRACT

A plurality of stacked door skins is provided, the plurality including at least first and second door skins each including at least one inner panel, an outer body portion surrounding the at least one inner panel, and at least one contoured portion surrounding the at least one panel and interconnecting the at least one panel to the outer body portion. The at least one contoured portion includes a substantially V-shaped indent area adjacent to and within the outer body portion, a planar area that is substantially parallel to the outer body portion and is adjacent to and within the substantially V-shaped indent area, and a declining area adjacent to and within the planar area and terminating at the inner panel.

20 Claims, 27 Drawing Sheets

(56) References Cited

U.S. PATENT DOCUMENTS

| | | |
|---|---|---|
| 1,166,228 A | 12/1915 | Larson et al. |
| 1,270,013 A | 6/1918 | Conwell |
| 1,548,235 A | 8/1925 | Zahner |
| 1,642,553 A | 9/1927 | Nyman |
| 1,750,428 A | 3/1930 | Pearson |
| 1,771,304 A | 7/1930 | MacGruder |
| 1,797,440 A | 3/1931 | New |
| 1,844,817 A | 2/1932 | Determann |
| 2,429,395 A | 10/1947 | Arthur |
| 3,004,641 A | 10/1961 | Johnson |
| 5,361,552 A | 11/1994 | Fulford |
| 5,543,234 A | 8/1996 | Lynch et al. |
| 5,557,899 A | 9/1996 | Dube et al. |
| 5,771,656 A | 6/1998 | Amoretti |
| 6,185,894 B1 | 2/2001 | Sisco et al. |
| 6,389,768 B1 | 5/2002 | Gagne et al. |
| D472,407 S | 4/2003 | Lenger |
| D476,176 S | 6/2003 | Lenger |
| 7,022,414 B2 | 4/2006 | Davina et al. |
| D528,665 S | 9/2006 | Lynch et al. |
| D529,187 S | 9/2006 | Walsh et al. |
| D553,755 S | 10/2007 | Davina et al. |
| D564,103 S | 3/2008 | Meyer et al. |
| D566,296 S | 4/2008 | Walsh et al. |
| D585,143 S | 1/2009 | Steiber et al. |
| D586,475 S | 2/2009 | Maher |
| D587,815 S | 3/2009 | Steiber et al. |
| D588,708 S | 3/2009 | Steiber et al. |
| D588,709 S | 3/2009 | Walsh et al. |
| D590,512 S | 4/2009 | Mock et al. |
| D590,513 S | 4/2009 | Mock et al. |
| D590,521 S | 4/2009 | Mock et al. |
| D590,955 S | 4/2009 | Mock et al. |
| D590,956 S | 4/2009 | Mock et al. |
| D594,133 S | 6/2009 | Williams |
| D594,992 S | 6/2009 | Williams |
| D597,681 S | 8/2009 | Amato |
| D598,133 S | 8/2009 | Davina et al. |
| D601,369 S | 10/2009 | Mock et al. |
| D616,117 S | 5/2010 | Steiber et al. |
| D617,005 S | 6/2010 | Mullet |
| D621,062 S | 8/2010 | Mullet |
| D623,313 S | 9/2010 | Maher |
| 7,823,353 B2 | 11/2010 | Lynch et al. |
| 7,897,246 B2 | 3/2011 | Lynch |
| D635,688 S | 4/2011 | Lynch et al. |
| D649,262 S | 11/2011 | Walsh et al. |
| D661,814 S | 6/2012 | Lynch et al. |
| 8,707,639 B2 | 4/2014 | Thompson |
| 8,863,472 B2 | 10/2014 | Thompson et al. |
| 9,074,418 B2 | 7/2015 | Thompson et al. |
| D735,888 S | 8/2015 | Gouge et al. |
| 9,458,660 B2 | 10/2016 | Gouge et al. |
| 9,534,440 B2 | 1/2017 | Gouge et al. |
| 9,657,512 B2 | 5/2017 | Lynch et al. |
| D789,553 S | 6/2017 | Allen et al. |
| D790,728 S | 6/2017 | Allen et al. |
| D797,311 S | 9/2017 | Cox et al. |
| D802,795 S | 11/2017 | Gouge et al. |
| D813,412 S | 3/2018 | Gouge et al. |
| D827,860 S | 9/2018 | Allen et al. |
| D828,929 S | 9/2018 | Cox et al. |
| D831,227 S | 10/2018 | Cox et al. |
| D844,175 S | 3/2019 | Allen et al. |
| D851,280 S | 6/2019 | Gouge et al. |
| D883,520 S | 5/2020 | Pepin et al. |
| D893,751 S | 8/2020 | Pepin et al. |
| D893,752 S | 8/2020 | Pepin et al. |
| D893,755 S | 8/2020 | Ege et al. |
| D898,226 S | 10/2020 | Ege et al. |
| D919,120 S | 5/2021 | Pepin et al. |
| D919,121 S | 5/2021 | Ege et al. |
| D920,540 S | 5/2021 | Pepin et al. |
| D940,899 S | 1/2022 | Pepin et al. |
| D943,116 S | 2/2022 | Ege et al. |
| 11,293,213 B2 | 4/2022 | Ege et al. |
| D992,150 S | 7/2023 | Pepin et al. |
| D996,648 S | 8/2023 | Pepin et al. |
| D1,001,315 S | 10/2023 | Allen et al. |
| D1,001,316 S | 10/2023 | Gouge et al. |
| D1,001,317 S | 10/2023 | Gouge et al. |
| 2004/0103615 A1 | 6/2004 | Lynch et al. |
| 2005/0166402 A1 | 8/2005 | Liittschwager et al. |
| 2005/0193655 A1 | 9/2005 | Paxton et al. |
| 2006/0000173 A1 | 1/2006 | Edstrom |
| 2009/0044471 A1 | 2/2009 | Harlin et al. |
| 2009/0277109 A1 | 11/2009 | Taylor et al. |
| 2015/0322710 A1 | 11/2015 | Allen |
| 2015/0360445 A1 | 12/2015 | Cai |
| 2016/0040476 A1 | 2/2016 | Gouge et al. |
| 2016/0186482 A1 | 6/2016 | Lynch |
| 2018/0179807 A1 | 6/2018 | Wang et al. |
| 2019/0195004 A1 | 6/2019 | Pepin |
| 2019/0195005 A1 | 6/2019 | Di Iulio et al. |
| 2019/0234135 A1 | 8/2019 | Ege et al. |

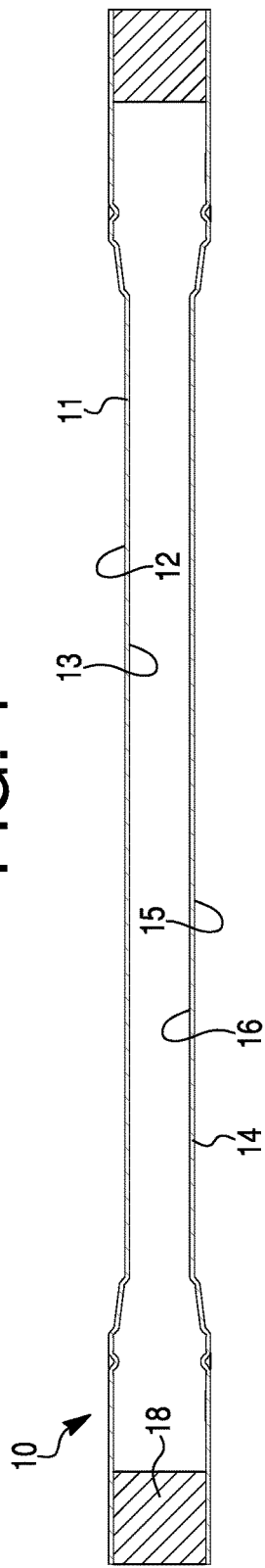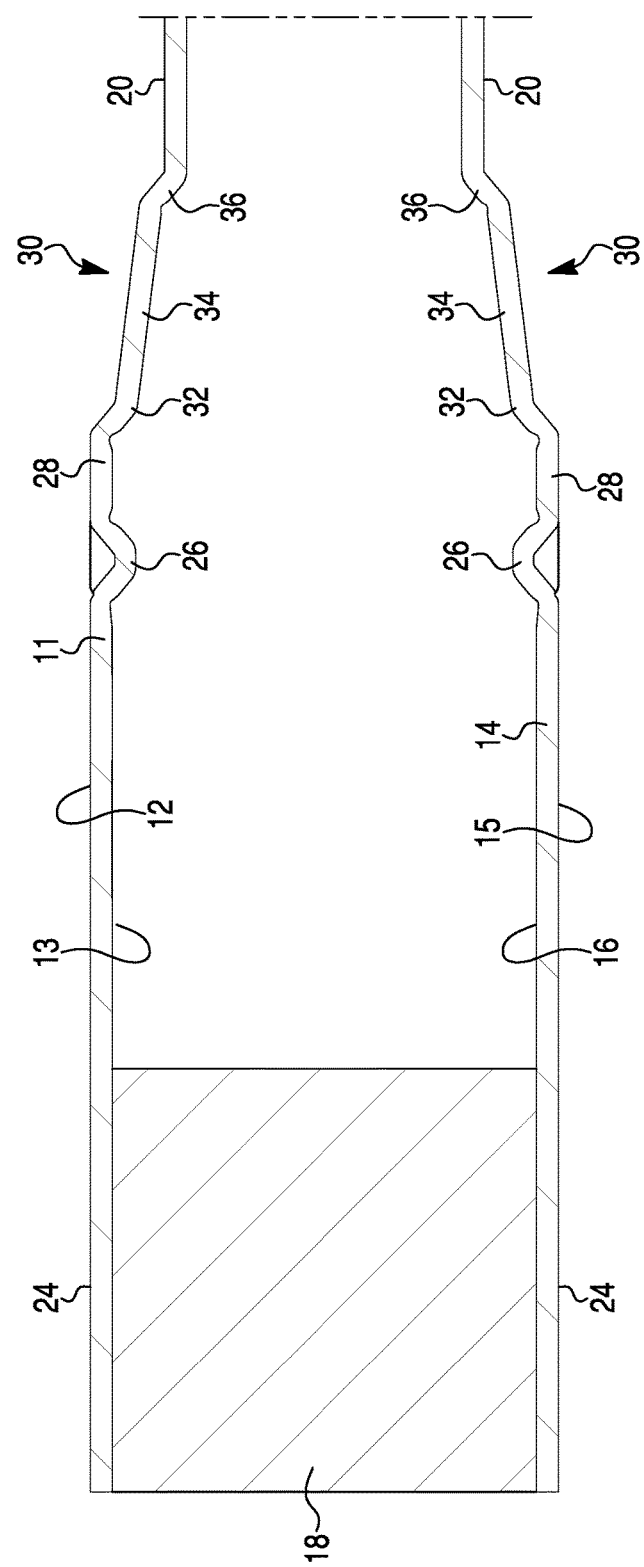

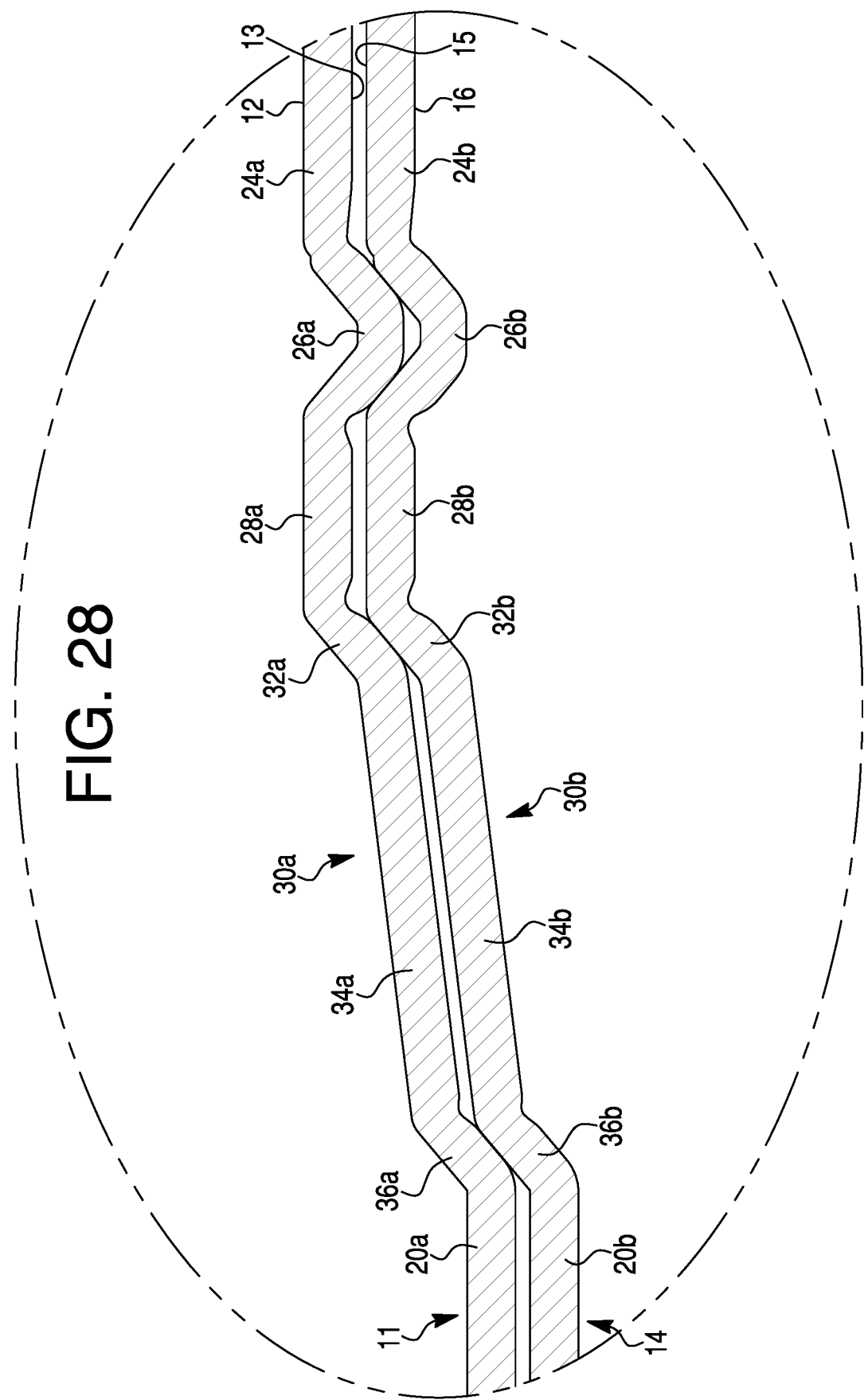

DOOR SKIN STACKING

This application is a continuation of U.S. patent application Ser. No. 16/379,304 filed Apr. 9, 2019, now U.S. Pat. No. 11,293,213, which is a continuation-in-part of U.S. patent application Ser. No. 15/784,306 filed Oct. 16, 2017, the complete disclosure of which is incorporated herein by reference and to which priority is claimed.

FIELD OF THE INVENTION

This invention relates door skins, sometimes known as door facings, and in particularly exemplary embodiments of the invention door skins made of cellulosic material and a binder resin. This invention also relates to doors including door skins and a doorframe, and to door skins configured into a stack of door skins to facilitate shipping and handling.

BACKGROUND

Traditional solid wood doors have become relatively expensive due to raw material costs. A commonplace alternative to traditional solid wood doors in residential and commercial buildings is a door assembly that includes a rectangular doorframe of stiles and rails, and door skins secured to the opposite sides of the doorframe to define a door cavity between the door skins and surrounded by the doorframe. The door skins can be made of, for example, steel, fiberglass composites, cellulosic (e.g., wood) composites such as high-density fiberboard (HDF) and medium density fiberboard (MDF), and other materials. Wood grain can be molded or embossed into the exterior surfaces of the door skins. Further, paneling can be formed in the exterior surfaces of the door skins to give an appearance that simulates solid wood products. The door cavity between the door skins typically yet optionally includes one or more core components.

SUMMARY OF THE INVENTION

According to an embodiment of the invention, a door skin stack is provided that includes a plurality of door skins, the door skins including at least a first door skin and a second door skin having identical profiles and each including at least one inner panel, an outer body portion surrounding the at least one inner panel, and at least one contoured portion surrounding the at least one panel and interconnecting the at least one panel to the outer body portion, the at least one contoured portion including a substantially V-shaped indent area adjacent to and within the outer body portion, a planar area that is substantially parallel to the outer body portion and is adjacent to and within the substantially V-shaped indent area, and a declining area adjacent to and within the planar area and terminating at the inner panel.

Other aspects of the invention, including door skins, assembled doors, stacked door skins, related methods, and the like which constitute part of the invention, will become more apparent upon reading the following detailed description of the exemplary embodiments.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings:

FIG. 1 is a cross-sectional view of a door taken along sectional line 1-1 of FIG. 6 according to an embodiment of the invention;

FIG. 2 is an enlarged fragmented view of a sectional profile region of the door of FIG. 1 taken along sectional line 2-2 of FIG. 6;

FIG. 28 is a is an enlarged fragmented view of a sectional profile region of the stacked door skins within the broken-line oval area 28 of FIG. 27.

DETAILED DESCRIPTION OF THE EXEMPLARY EMBODIMENTS AND EXEMPLARY METHODS

Figure 3:
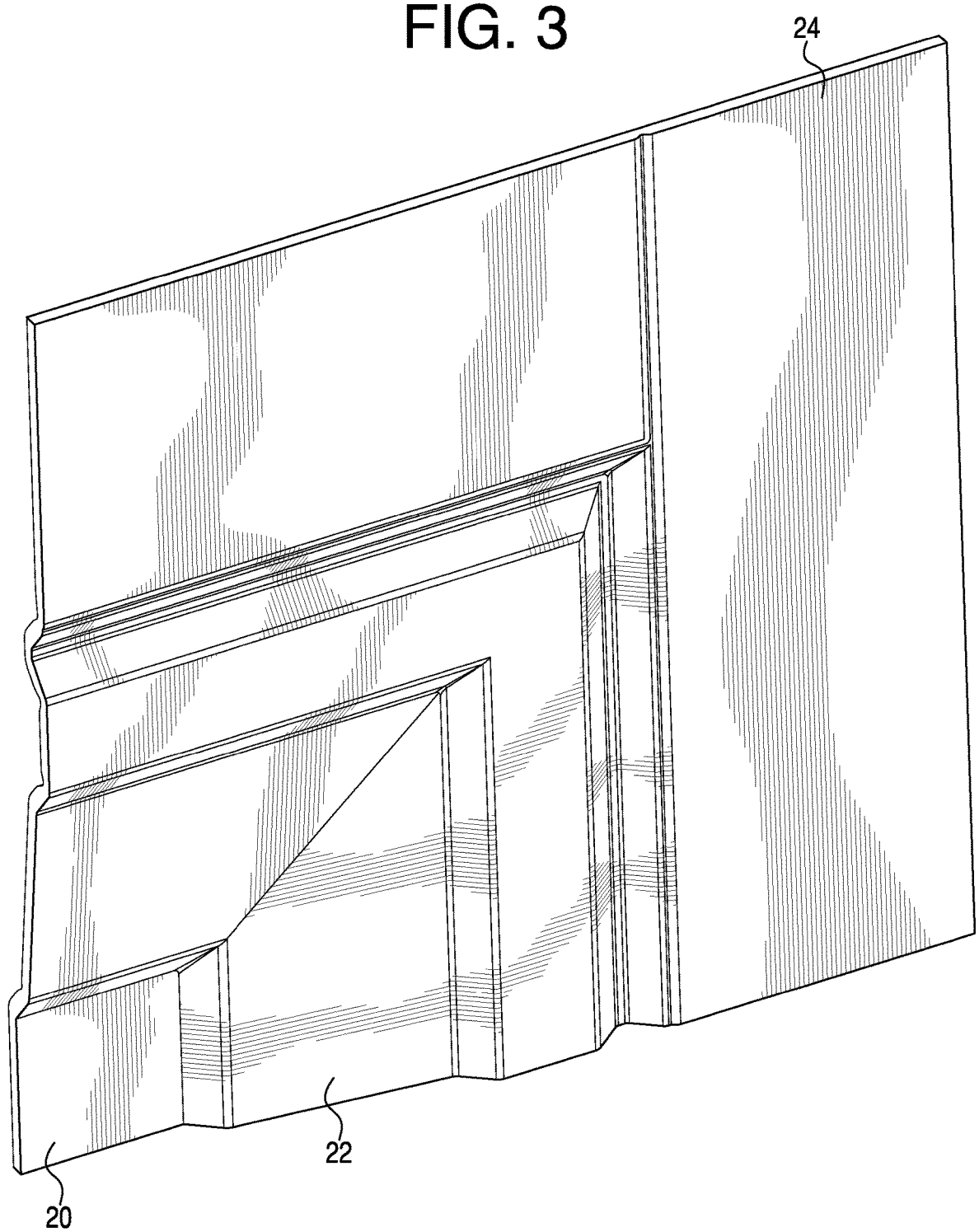
FIG. 3 is an enlarged, fragmented, perspective view of a front exterior surface of a door skin illustrating a panel profile according to the invention.
Figure 4:
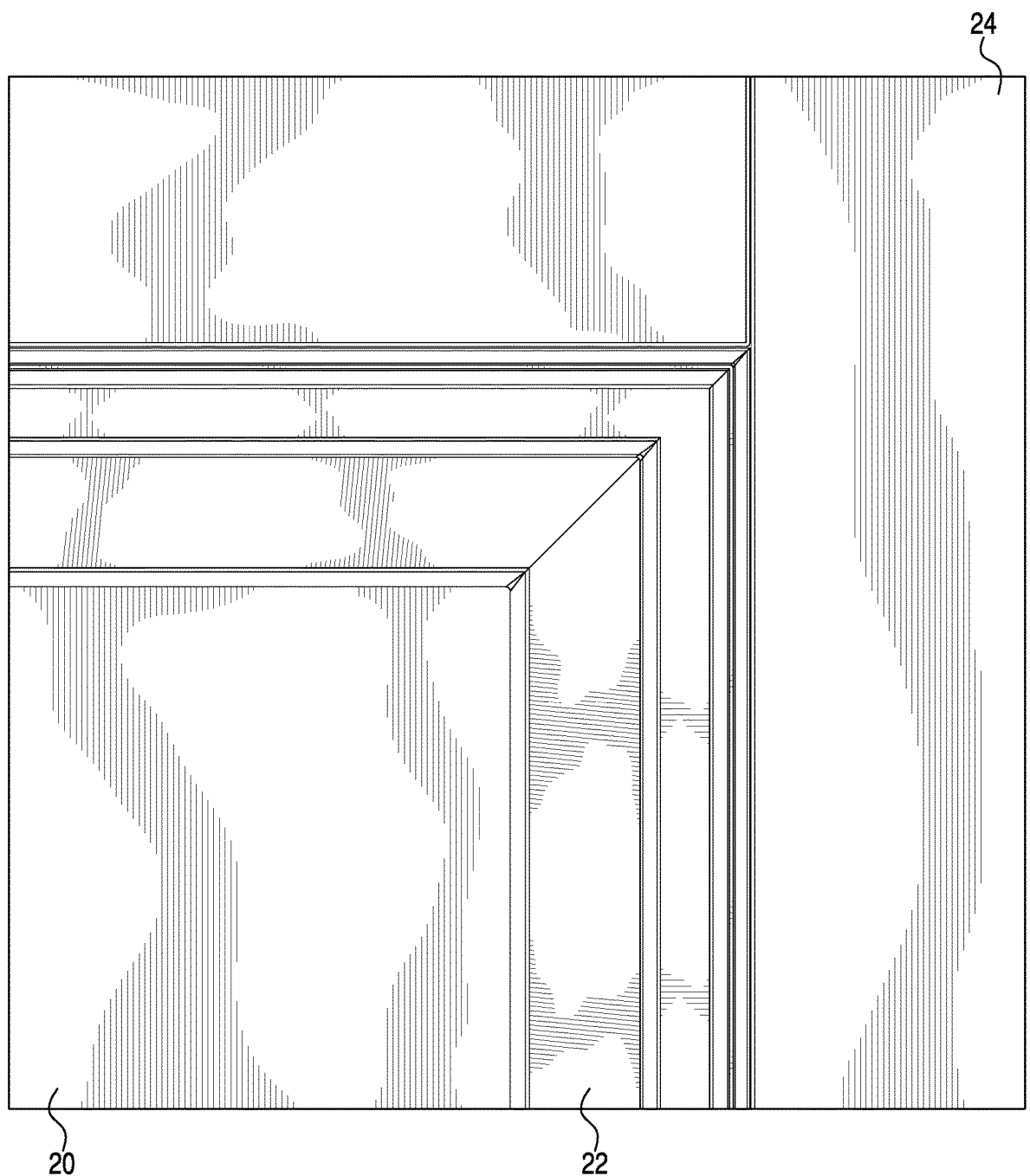
FIG. 4 is an enlarged, fragmented, elevational view of the front exterior surface of the door skin taken within box 4 of FIG. 6.
Figure 5:
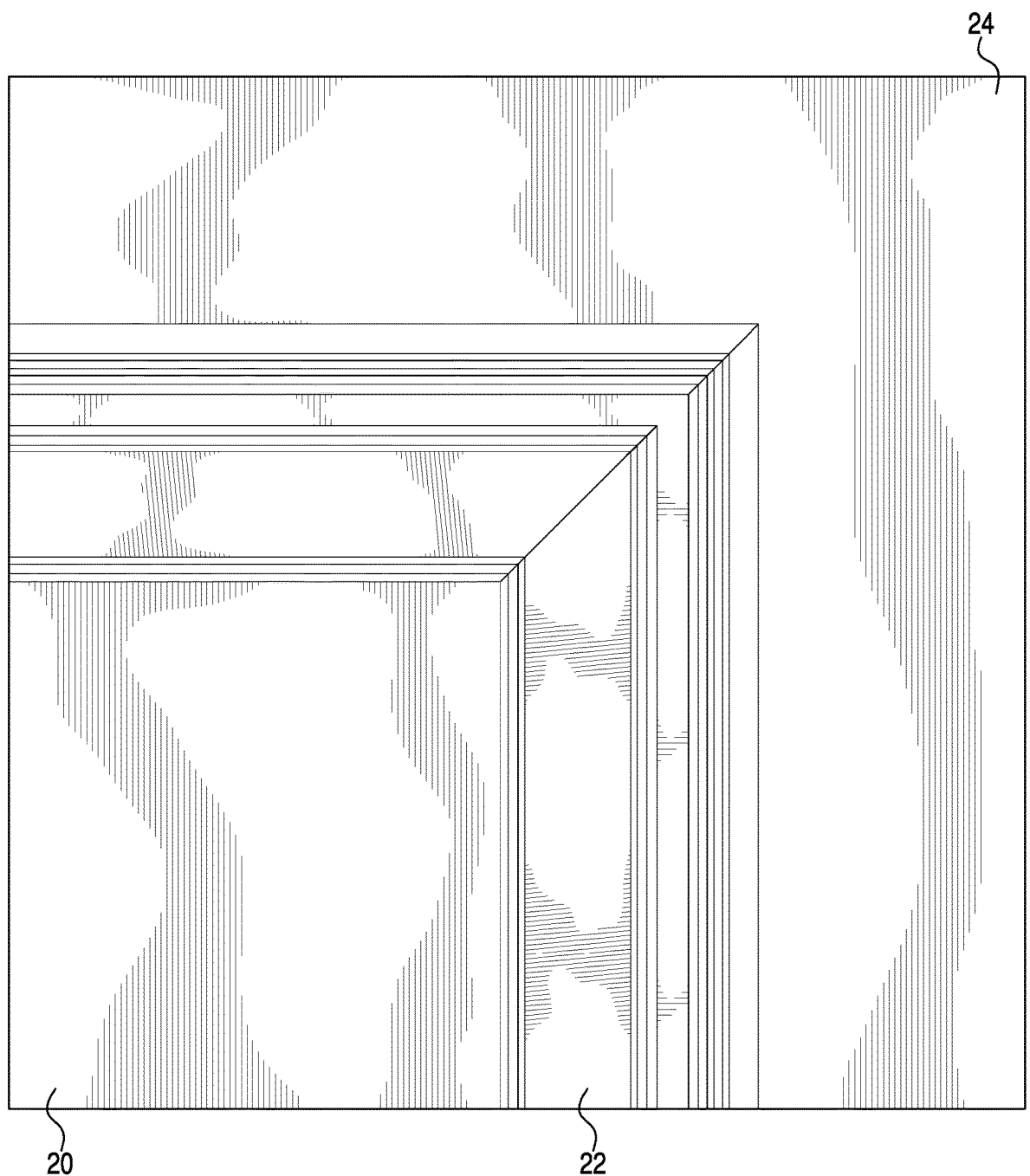
FIG. 5 is an enlarged, fragmented, elevational view of a rear exterior surface of the front exterior surface fragmented view of FIG. 4.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

Referring to FIGS. 1-6, there is illustrated a first embodiment of a single-panel door, generally designated by reference numeral 10, including a first door skin 11 and a second door skin 14. The door skins 11 and 14 may be identical with identical profiles, as shown, by molding (e.g., compression molding) the skins 11, 14 in the same molding apparatus and from the same materials. The first door skin 11 has a first exterior surface 12 and an opposite first interior surface 13. Likewise, the second door skin 14 has a second exterior surface 15 and an opposite second interior surface 16. The first and second exterior surfaces 12 and 15 are opposite or face away from one another. The first and second interior surfaces 13 and 16 face towards one another. Although not shown in FIGS. 1-6, the first and second exterior surfaces 12 and 15 may be molded, embossed, or otherwise provided with a surface pattern or texture, such as a wood grain pattern and/or wood tonal areas that replicate the natural background tones of natural wood. The exterior surfaces 12 and 15 may have one or more coatings, which may include, for example, paint, stain, lacquer, and/or a protective finish. A frame 18 positioned about the periphery of the door skins 11 and 14 contacts and is adhered or otherwise secured to the first and second interior surfaces 13 and 16. Although not shown, a door core may be positioned between the first and second door skins 11 and 14.

The door skins 11 and 14 may be made from wood composite materials such as medium density fiberboard (MDF) or high-density fiberboard (HDF), fiberglass-reinforced polymer materials, metal (e.g., steel), or other materials. Preferably, the door skins 11 and 14 are molded wood composite articles made from a cellulosic mat containing a combination of cellulosic fibers and a natural or synthetic binder, such as a phenol formaldehyde or urea formaldehyde resin. The frame 18 may be made of wood, composite materials, metal, or other materials. The door cavity between the door skins typically yet optionally includes one or more core components (not shown). The core component(s) can be a pre-formed structure or formed in situ, such as by injecting a foam precursor composition into the door cavity and allowing the precursor composition to expand and fill the door cavity with foam.

The making of door skins in general and assembling of doors is known in the art, as described for example in U.S. Pat. No. 5,543,234 to Lynch et al. and U.S. Pat. No. 9,657,512.

The first and second door skins 11 and 14 of the first illustrated embodiment of FIGS. 1-6 are each a one-panel skin having an inner panel 20, an outer body portion or outer skirt 24 surrounding the inner panel 20, and a contoured portion or ovalo 22 interconnecting and integrally formed as a unitary piece with the inner panel 20 and the outer body portion 24. When viewed from the exterior side of the door skin 11, the contoured portion 22 defines a continuous depression extending into the planar portions of the exterior surface 12 toward the door core and around the entire periphery of inner panel 20. The contoured portion 22 preferably is continuous and has a uniform cross section, best shown in FIGS. 1 and 2, about its entire length.

As best shown in FIG. 2, the contoured portions 22 replicate fine millwork. Each contoured portion 22 includes a substantially V-shaped indent area 26 immediately adjacent to and within or interior relative to the outer body portion 24, a planar area 28 immediately adjacent to and within the substantially V-shaped indent area 26 that is substantially parallel to and coplanar with the outer body portion 24, and a declining or tapering area 30 immediately adjacent to and within the planar area 28 that terminates at the inner panel 20. The declining area 30 has three angled zones 32, 34, and 36 interconnected to one another, with the outer and inner angled zones 32 and 36 declining or tapering at a greater rate than the intermediate angled zone 34 therebetween. Due mostly to the declining or tapering areas 30, the inner panels 20 of the first and second door skins 11 and 14 are spaced more closely to one another than the outer body portions 24 of the door skins 11 and 14.

Figure 6:
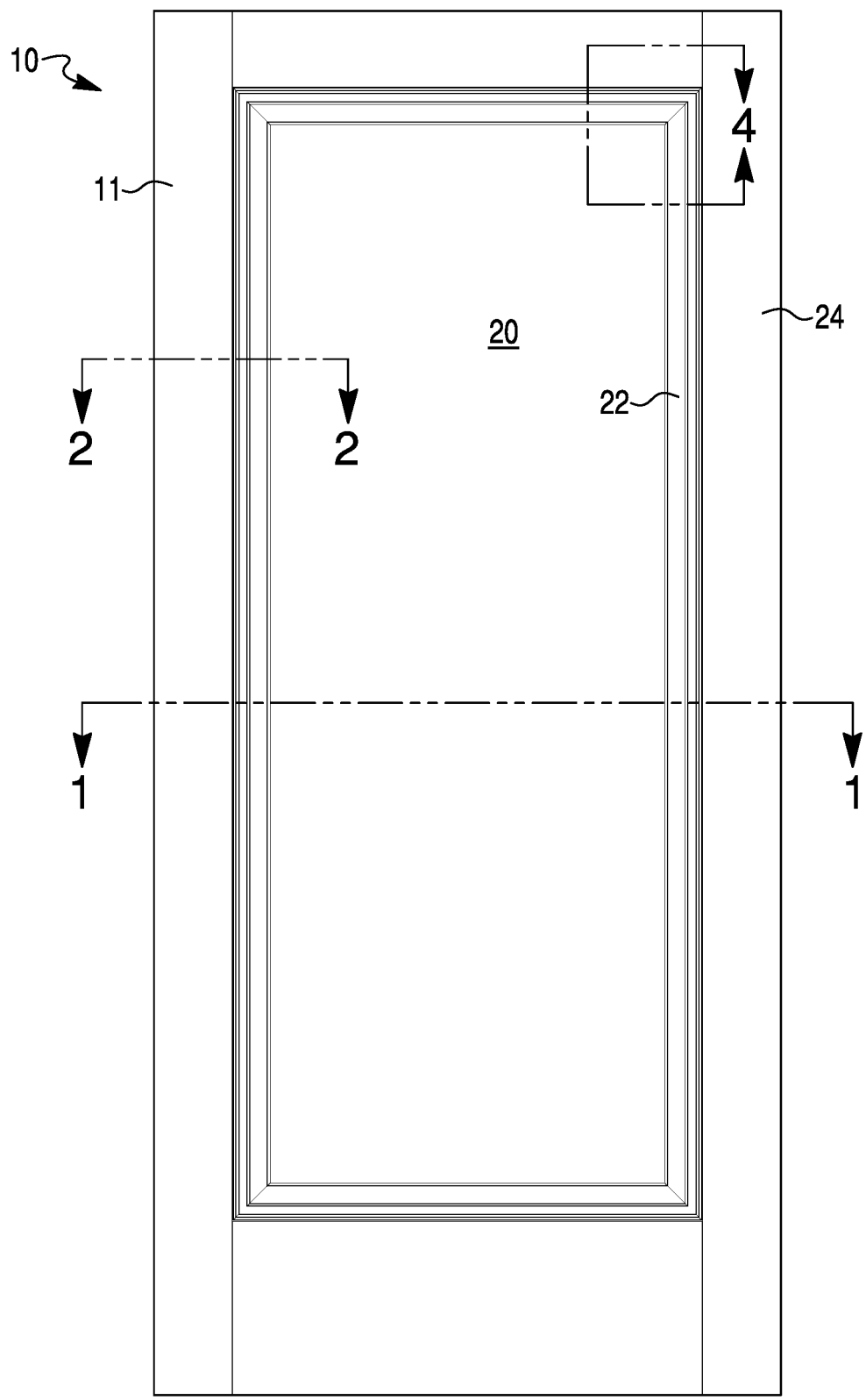
FIG. 6 is a front elevational view of a door skin according to a first embodiment of the invention.
Figure 7:
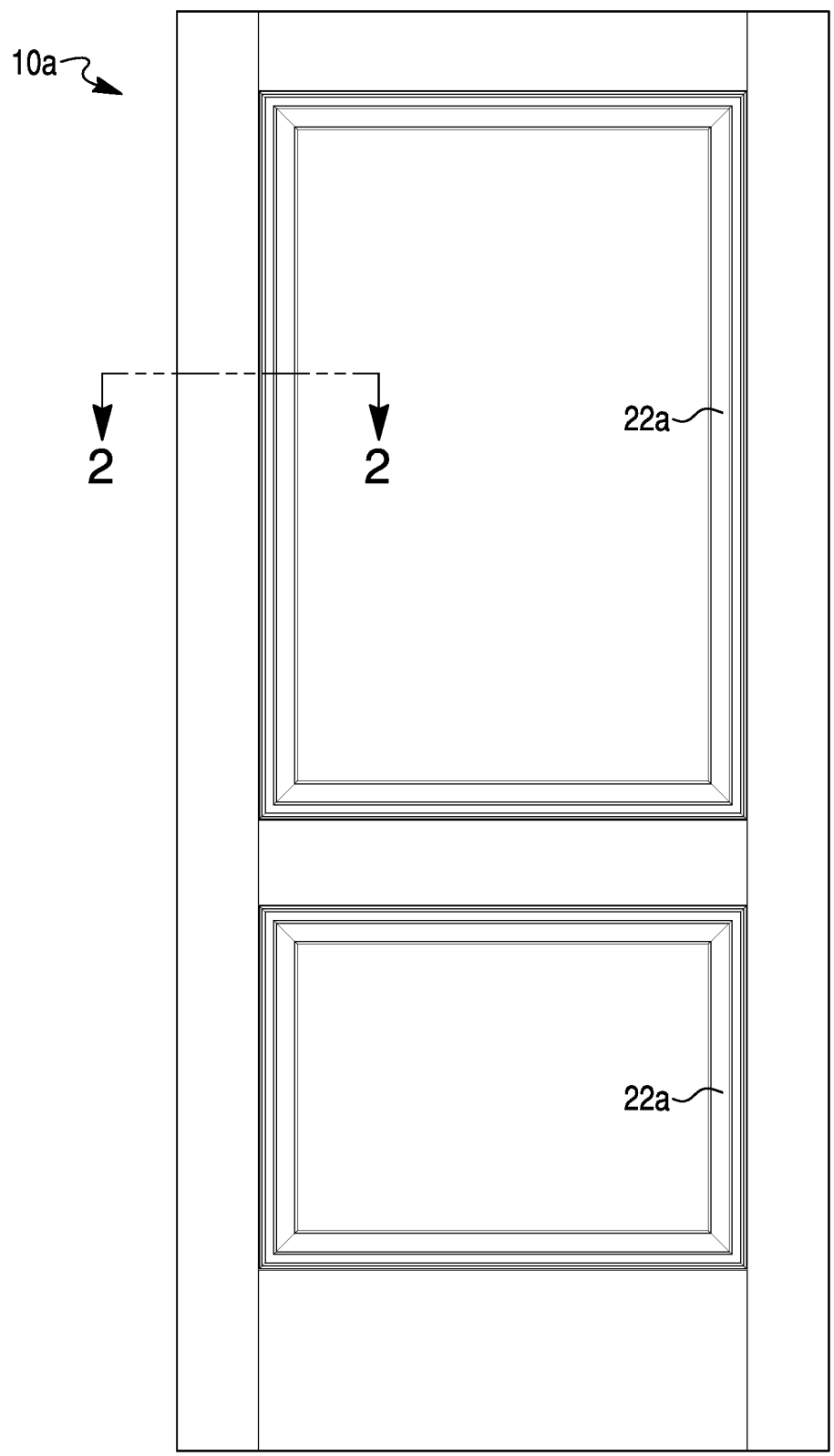
FIG. 7 is a front elevational view of a door skin according to a second embodiment of the invention having a sectional profile region taken along sectional line 2-2 of FIG. 7 that is identical to the sectional profile region of FIG. 2.
Figure 8:
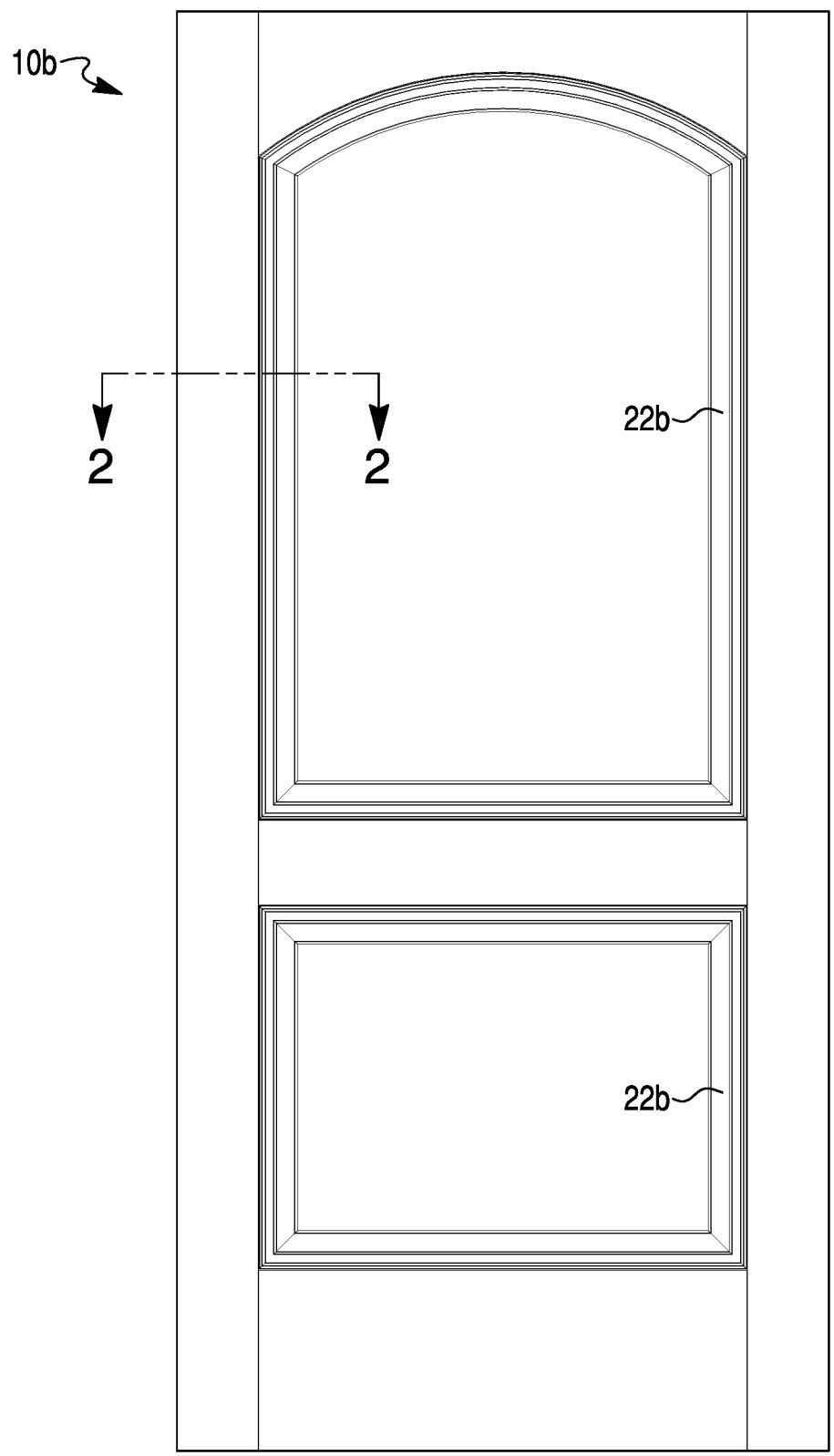
FIG. 8 is a front elevational view of a door skin according to a third embodiment of the invention having a sectional profile region taken along sectional line 2-2 of FIG. 8 that is identical to the sectional profile region of FIG. 2.
Figure 9:
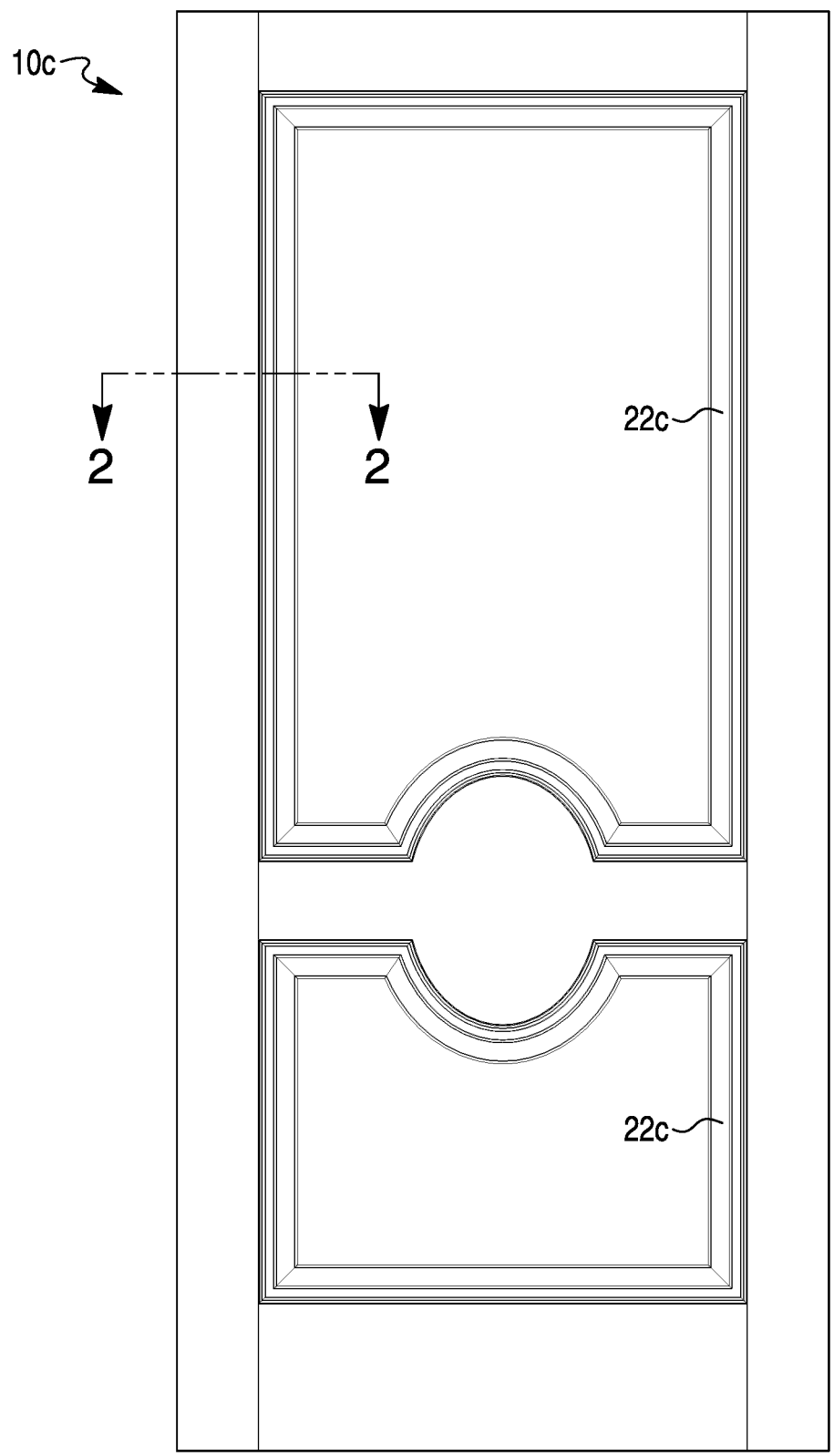
FIG. 9 is a front elevational view of a door skin according to a fourth embodiment of the invention having a sectional profile region taken along sectional line 2-2 of FIG. 9 that is identical to the sectional profile region of FIG. 2.
Figure 10:
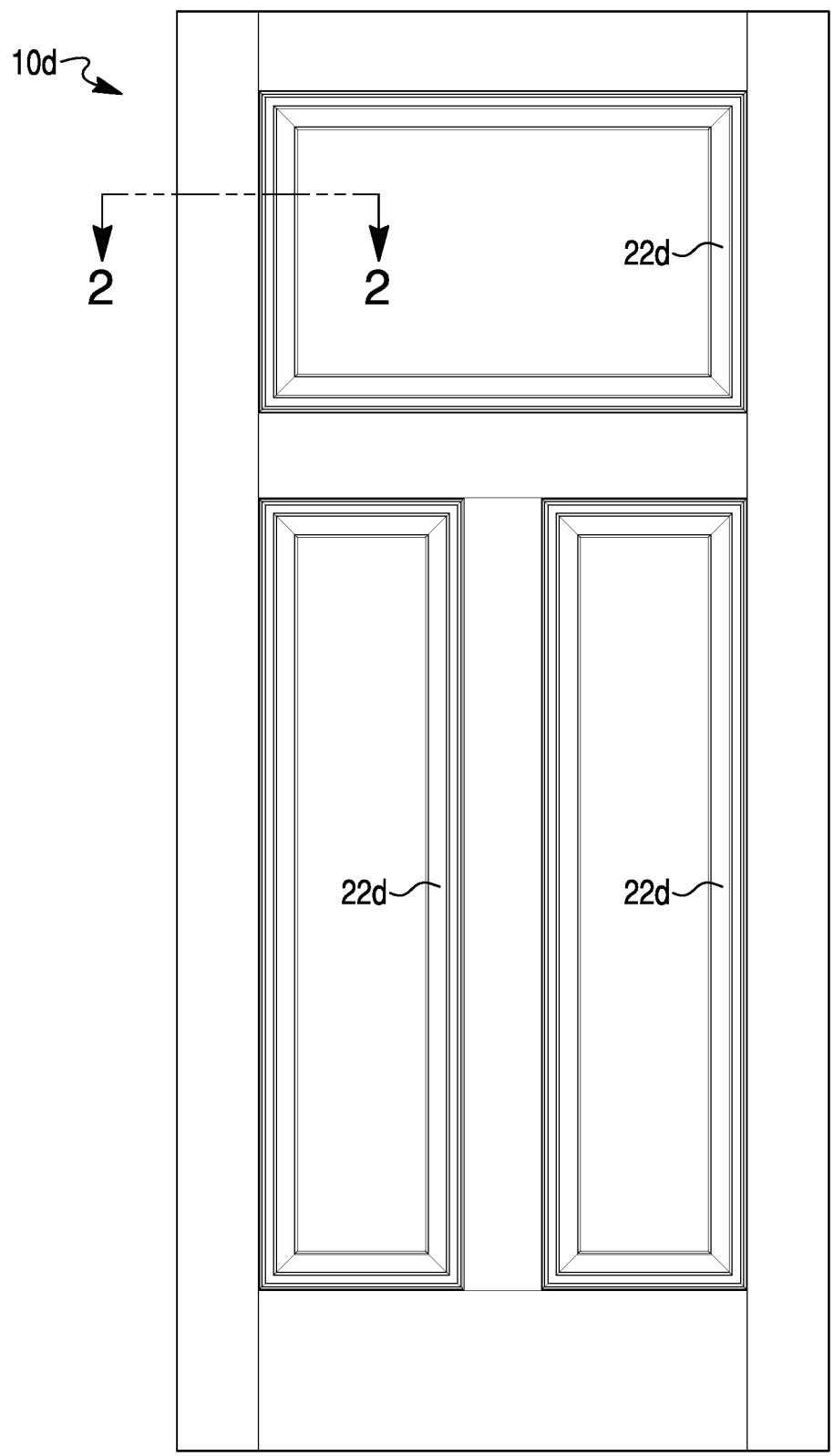
FIG. 10 is a front elevational view of a door skin according to a fifth embodiment of the invention having a sectional profile region taken along sectional line 2-2 of FIG. 10 that is identical to the sectional profile region of FIG. 2.
Figure 11:
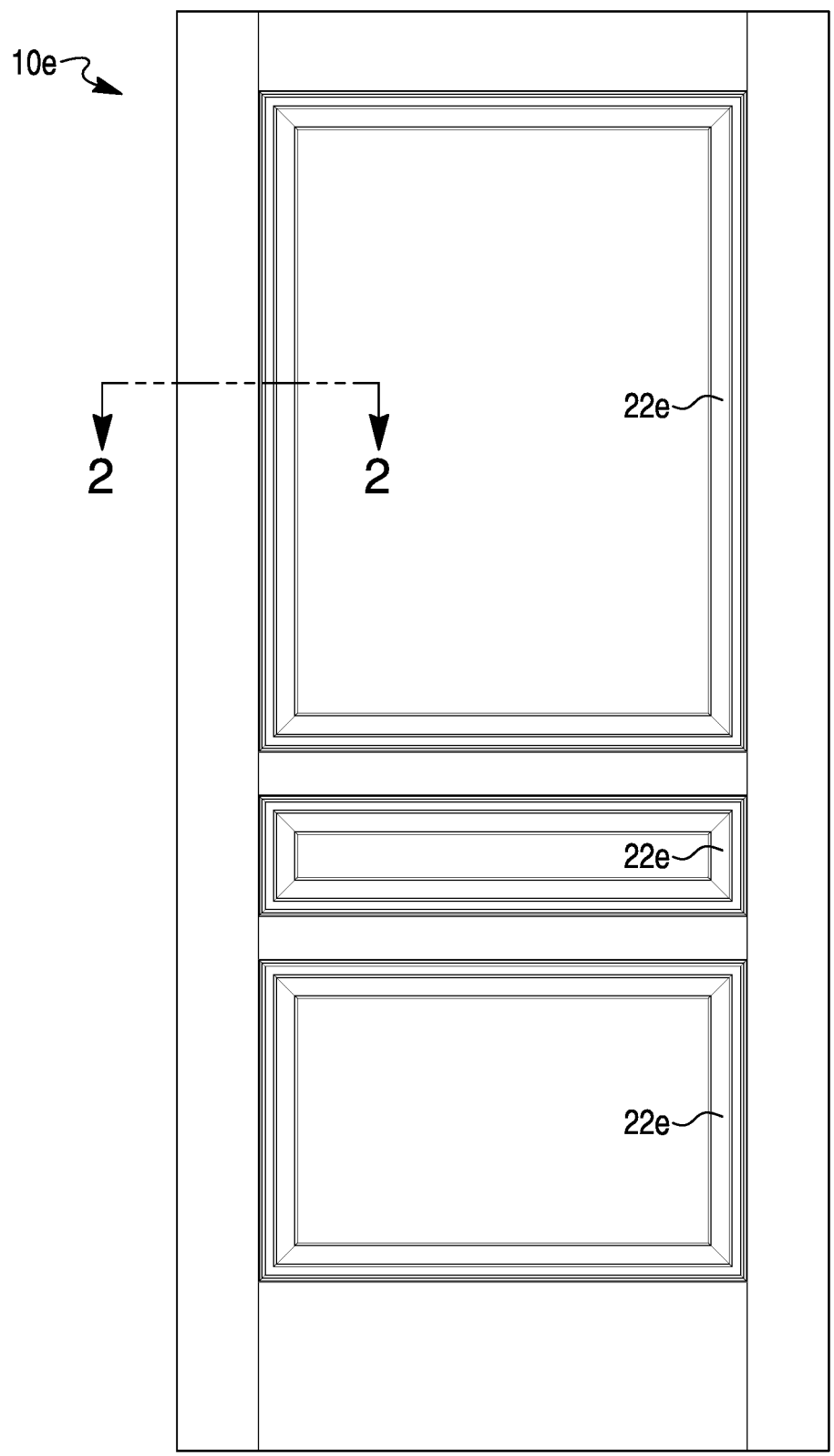
FIG. 11 is a front elevational view of a door skin according to a sixth embodiment of the invention having a sectional profile region taken along sectional line 2-2 of FIG. 11 that is identical to the sectional profile region of FIG. 2.
Figure 12:
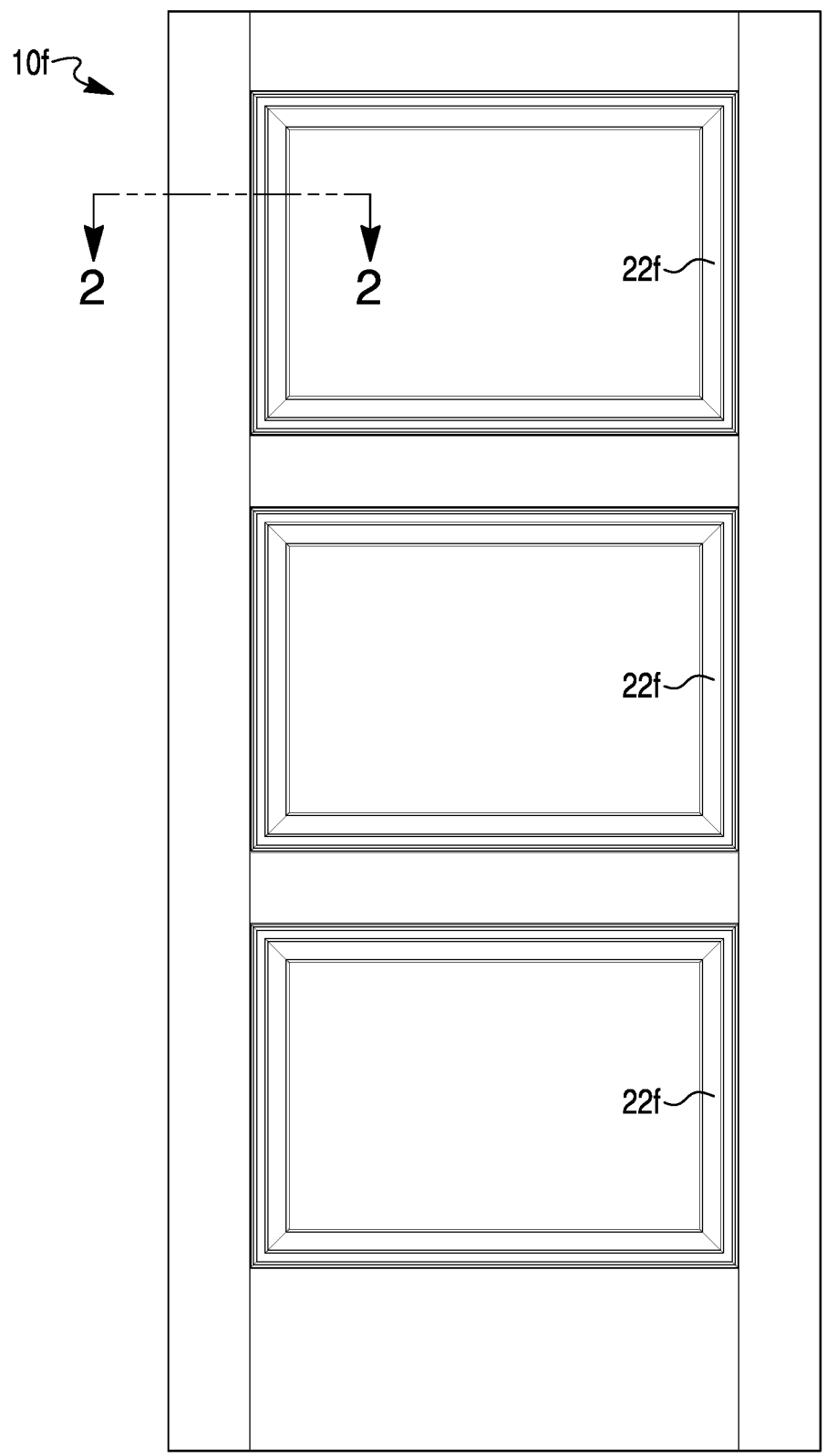
FIG. 12 is a front elevational view of a door skin according to a seventh embodiment of the invention having a sectional profile region taken along sectional line 2-2 of FIG. 12 that is identical to the sectional profile region of FIG. 2.
Figure 13:
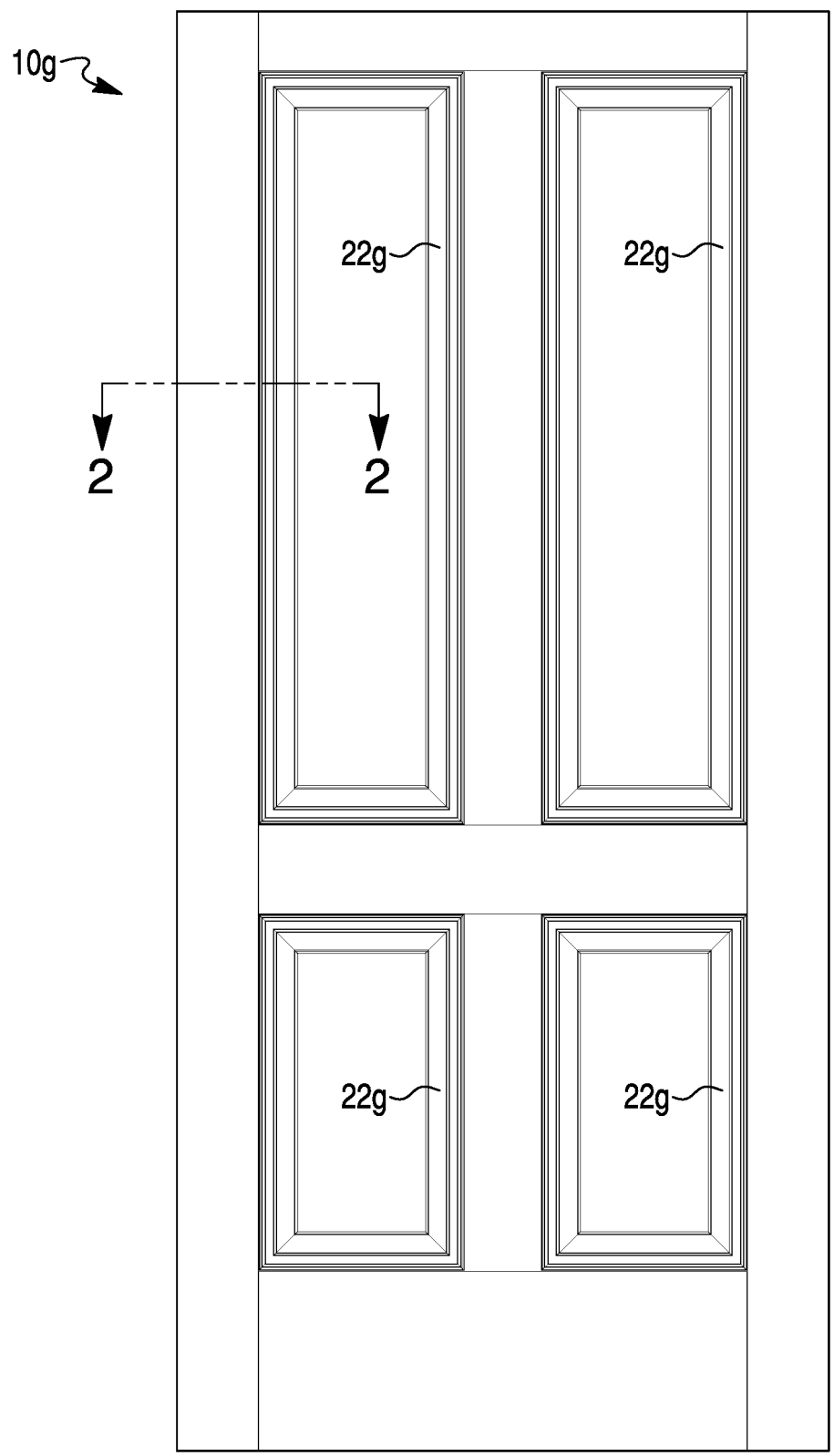
FIG. 13 is a front elevational view of a door skin according to an eighth embodiment of the invention having a sectional profile region taken along sectional line 2-2 of FIG. 13 that is identical to the sectional profile region of FIG. 2.
Figure 14:
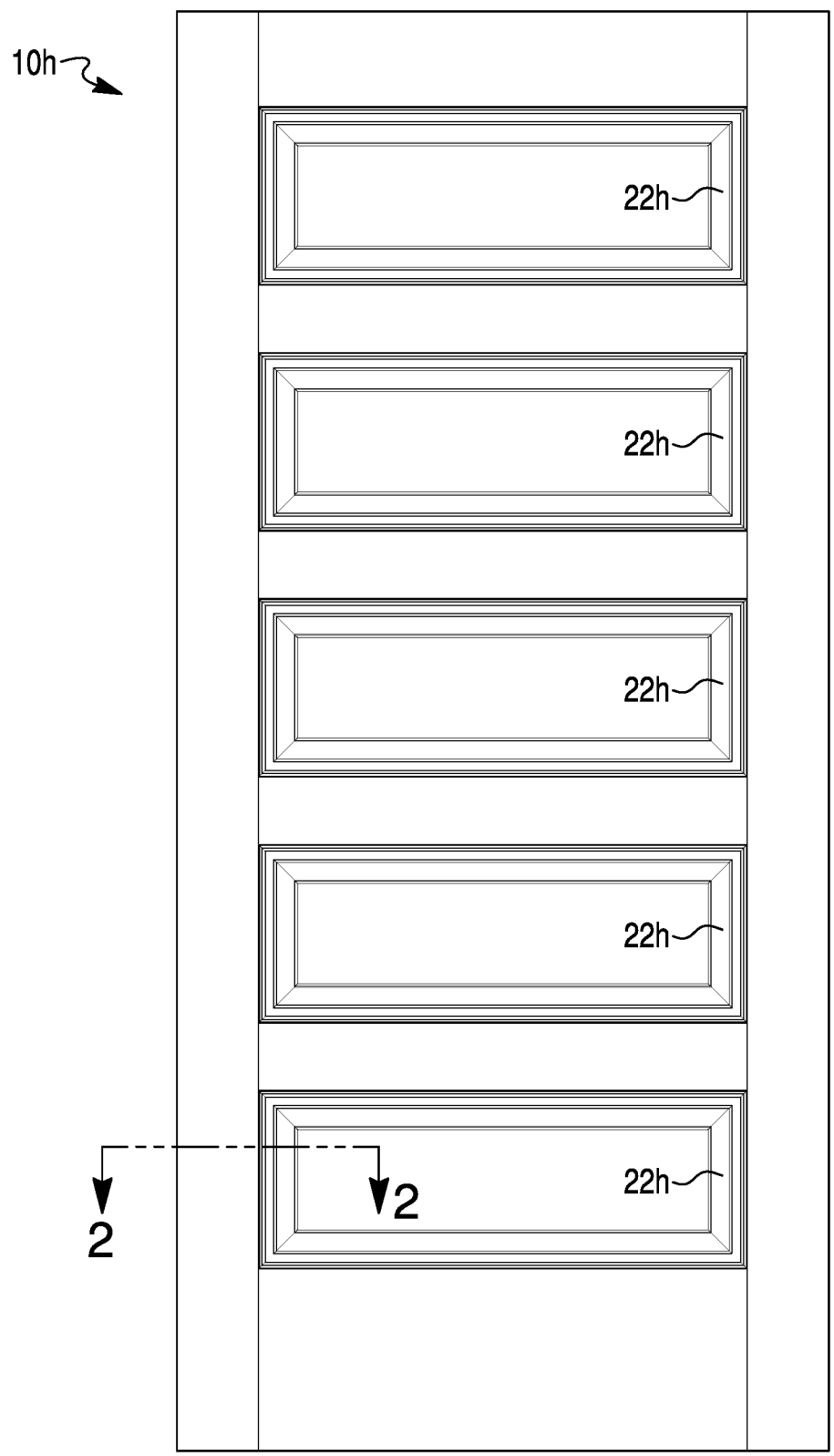
FIG. 14 is a front elevational view of a door skin according to a ninth embodiment of the invention having a sectional profile region taken along sectional line 2-2 of FIG. 14 that is identical to the sectional profile region of FIG. 2.
Figure 15:
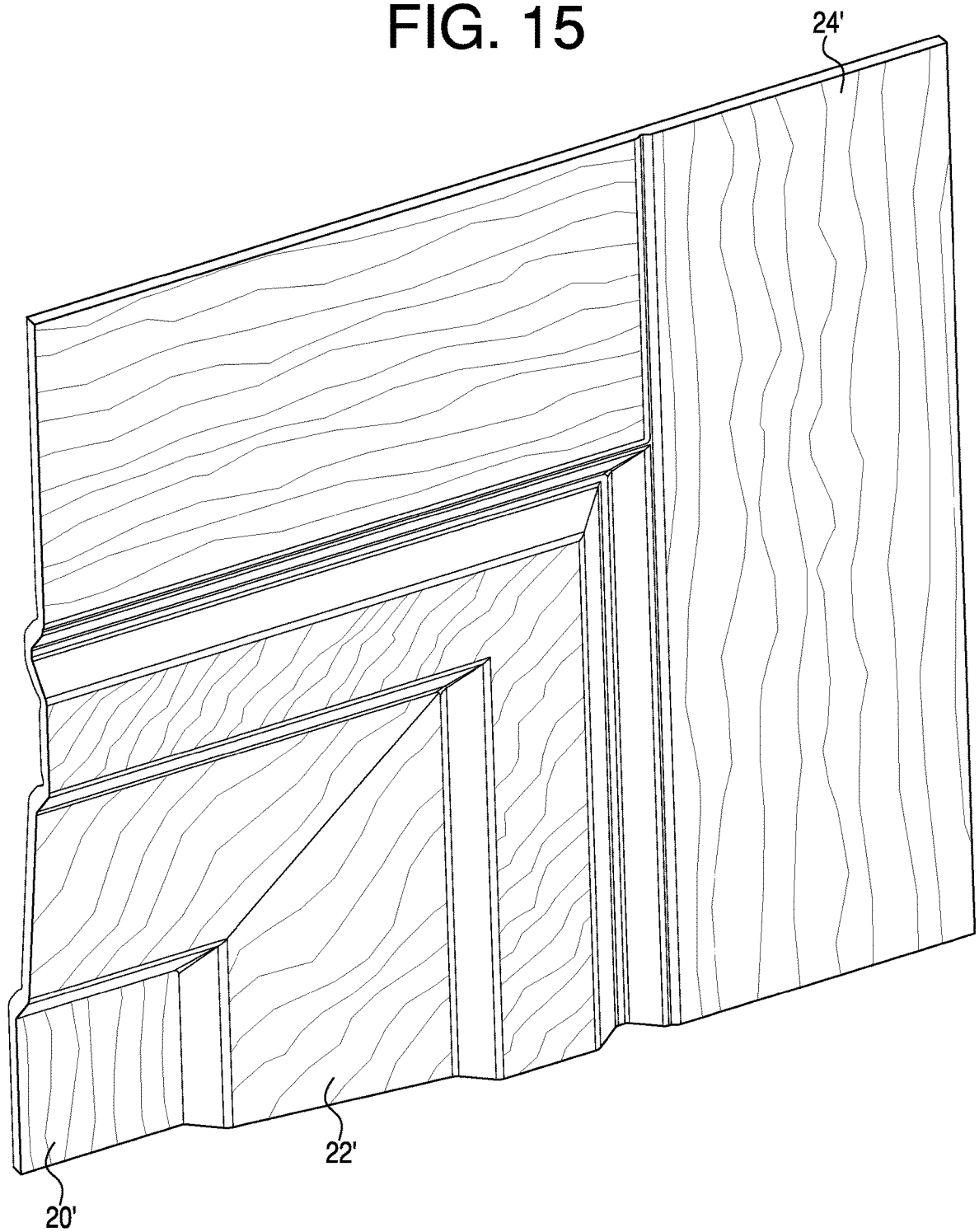
FIG. 15 is an enlarged, fragmented, perspective view of a front exterior surface of a door skin having a wood grain appearance.
Figure 16:
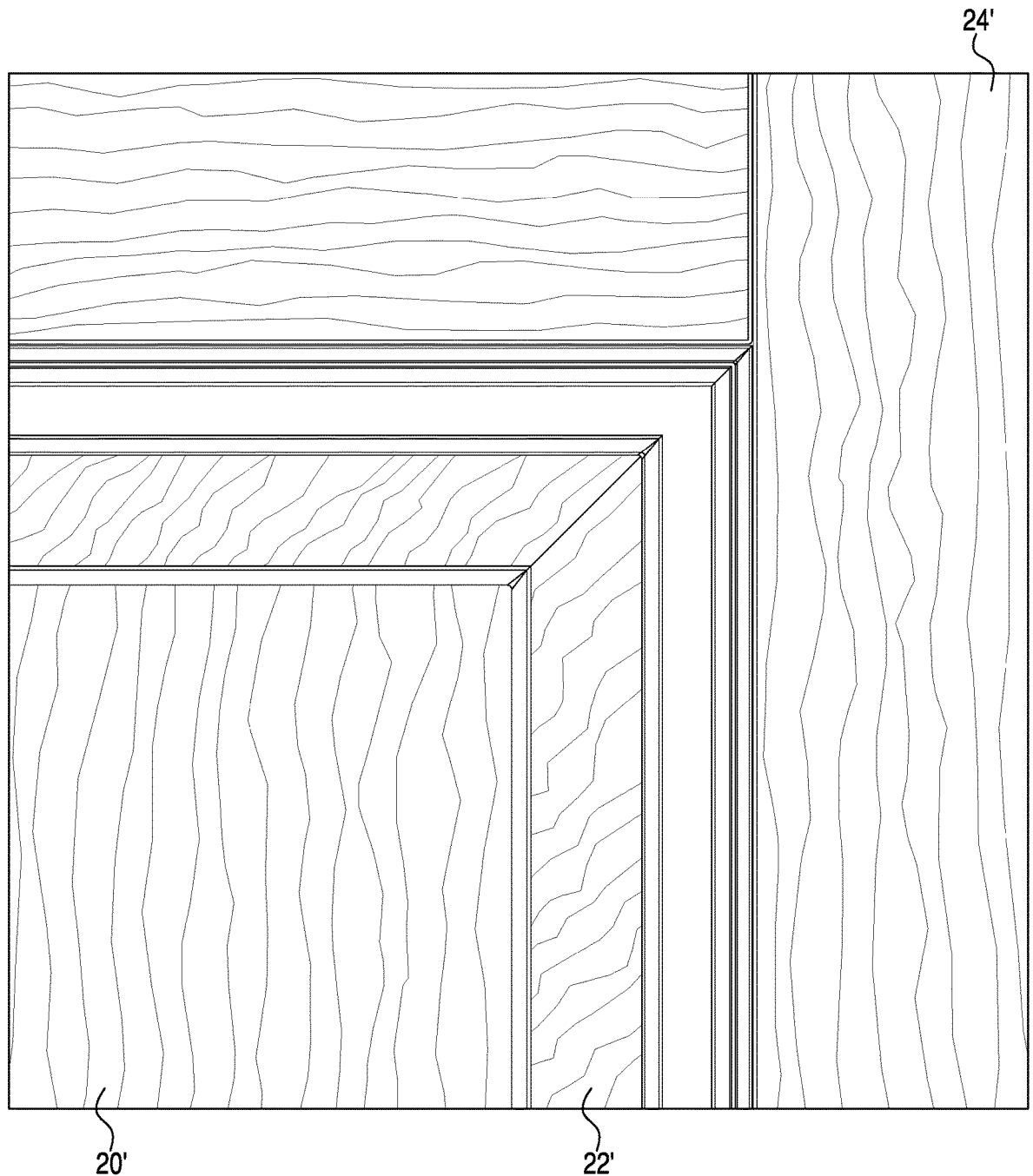
FIG. 16 is an enlarged, fragmented, elevational view of the front exterior surface of the door skin taken within box 16 of FIG. 18.
Figure 17:
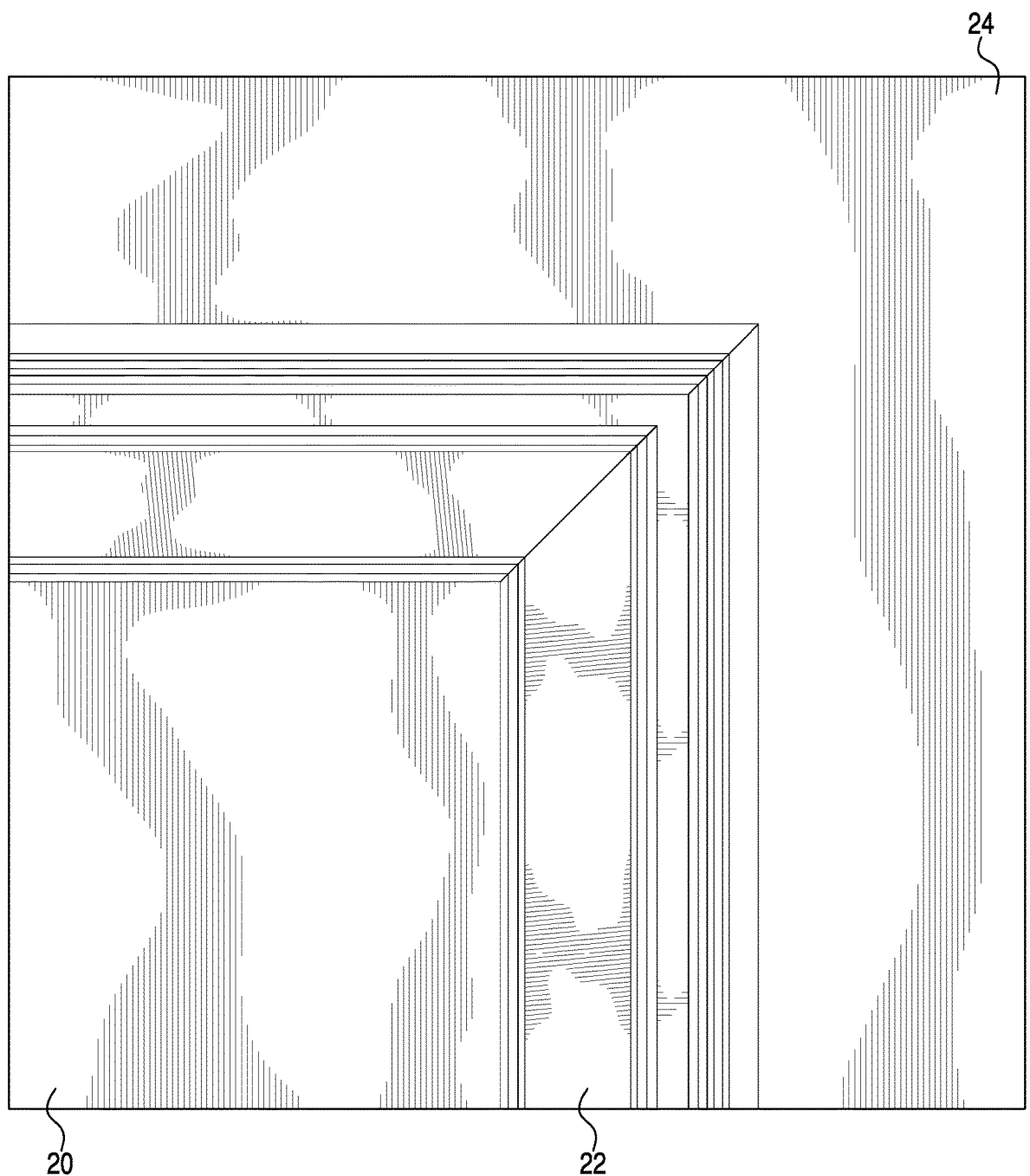
FIG. 17 is an enlarged, fragmented, elevational view of a rear exterior surface of the front exterior surface fragmented view of FIG. 16.
Figure 18:
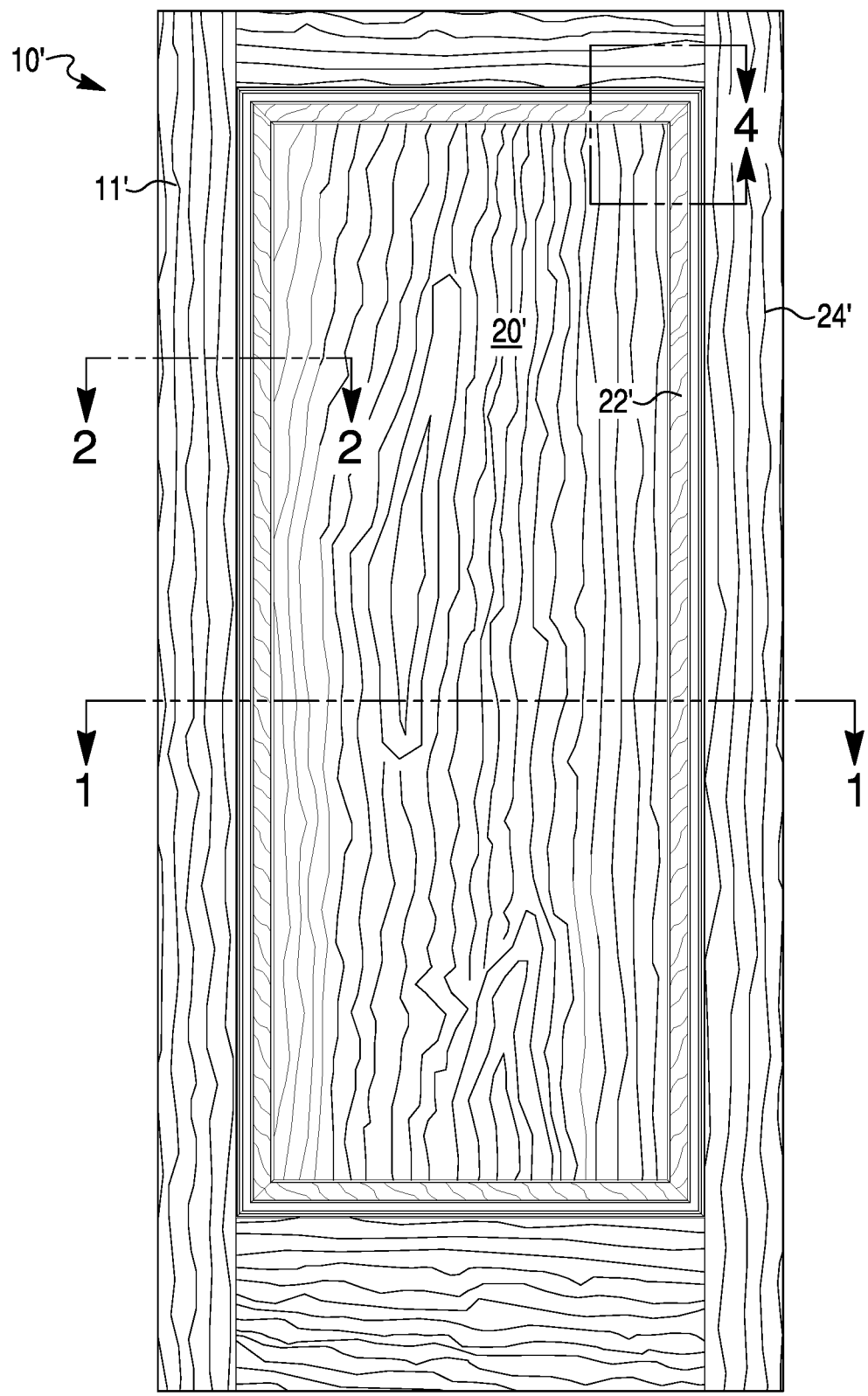
FIG. 18 is a front elevational view of a door skin according to a tenth embodiment of the invention.
Figure 19:
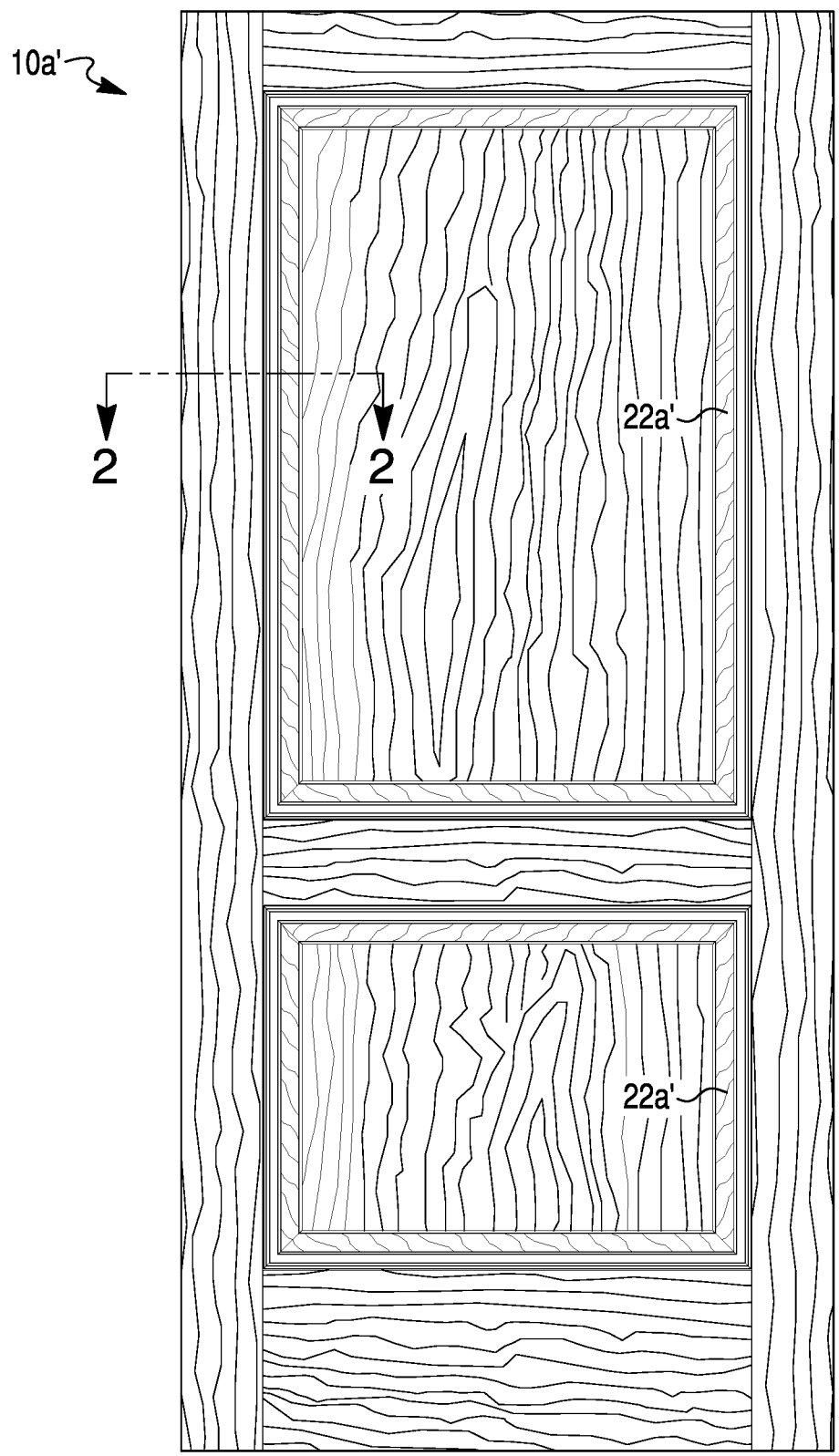
FIG. 19 is a front elevational view of a door skin according to an eleventh embodiment of the invention having a sectional profile region taken along sectional line 2-2 of FIG. 19 that is identical to the sectional profile region of FIG. 2.
Figure 20:
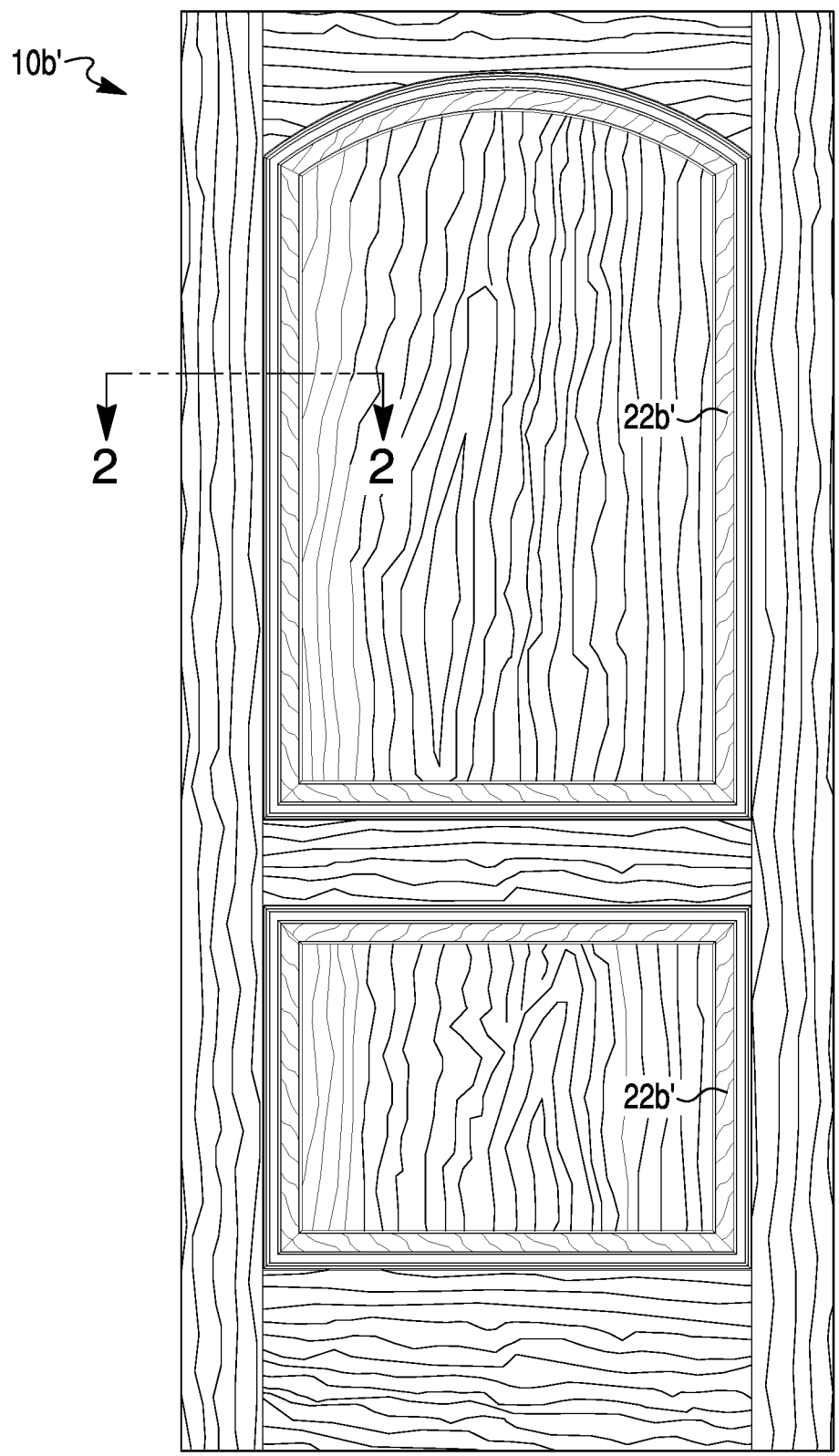
FIG. 20 is a front elevational view of a door skin according to a twelfth embodiment of the invention having a sectional profile region taken along sectional line 2-2 of FIG. 20 that is identical to the sectional profile region of FIG. 2.
Figure 21:
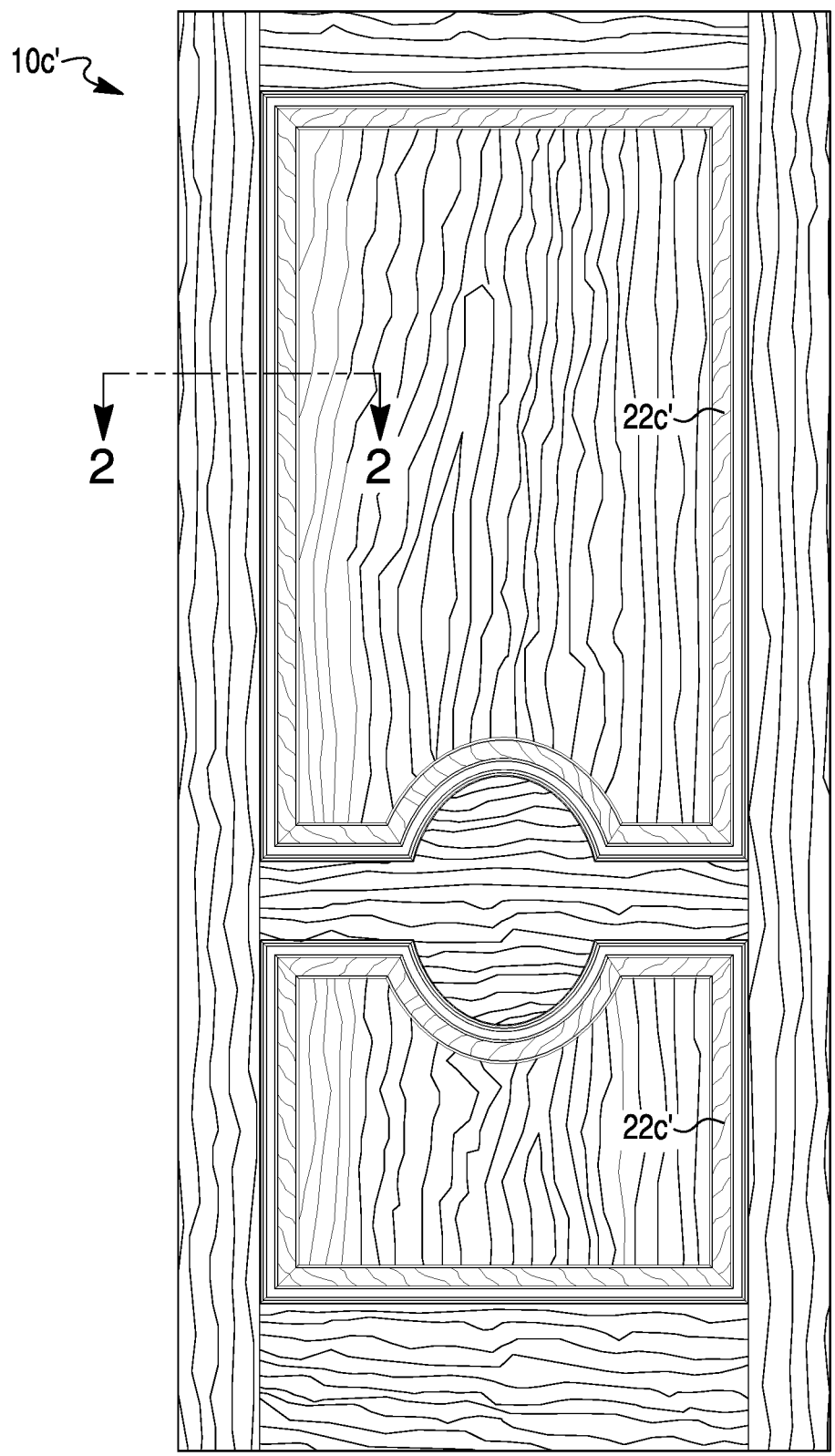
FIG. 21 is a front elevational view of a door skin according to a thirteenth embodiment of the invention having a sectional profile region taken along sectional line 2-2 of FIG. 21 that is identical to the sectional profile region of FIG. 2.
Figure 22:
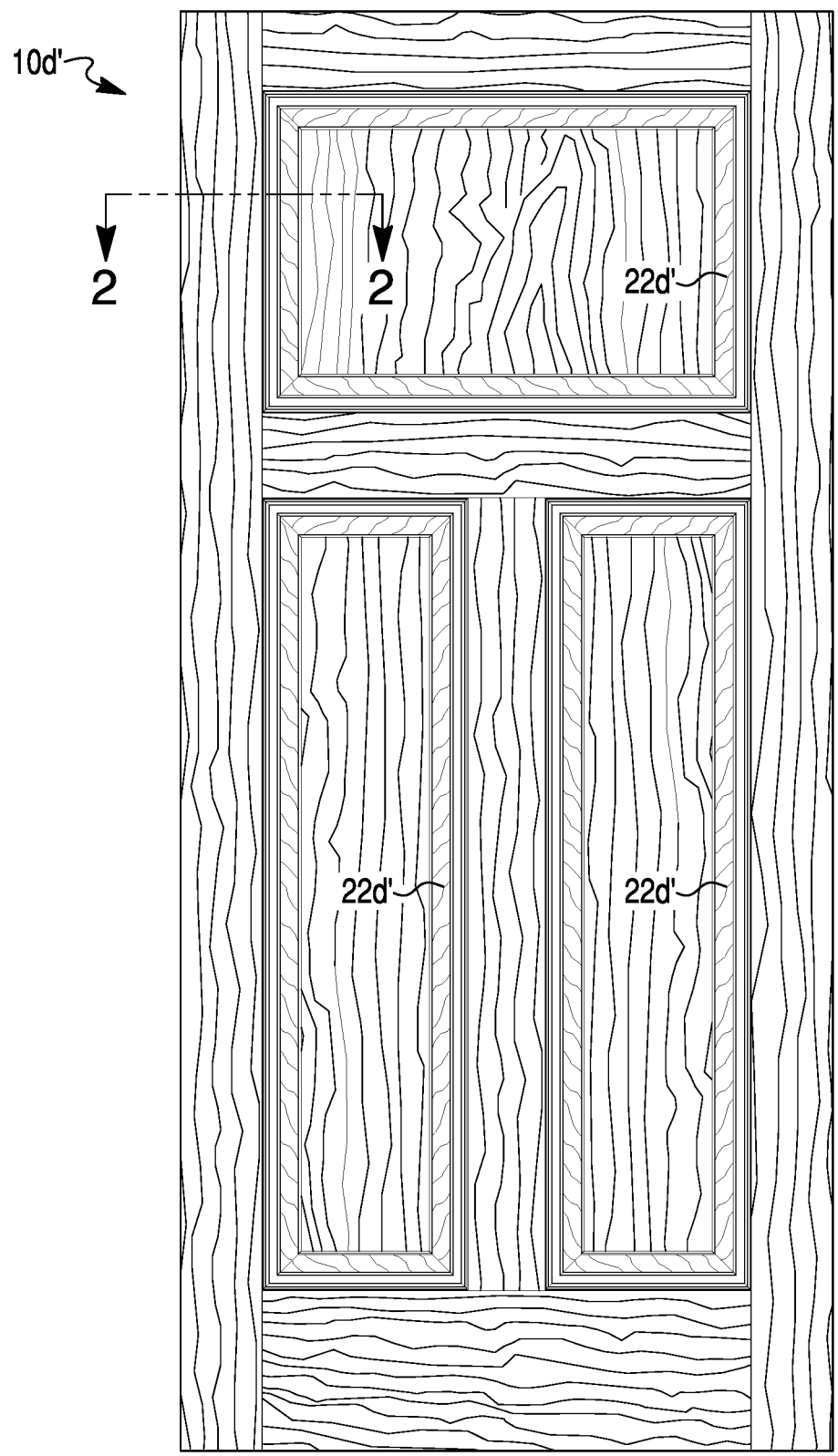
FIG. 22 is a front elevational view of a door skin according to a fourteenth embodiment of the invention having a sectional profile region taken along sectional line 2-2 of FIG. 22 that is identical to the sectional profile region of FIG. 2.
Figure 23:
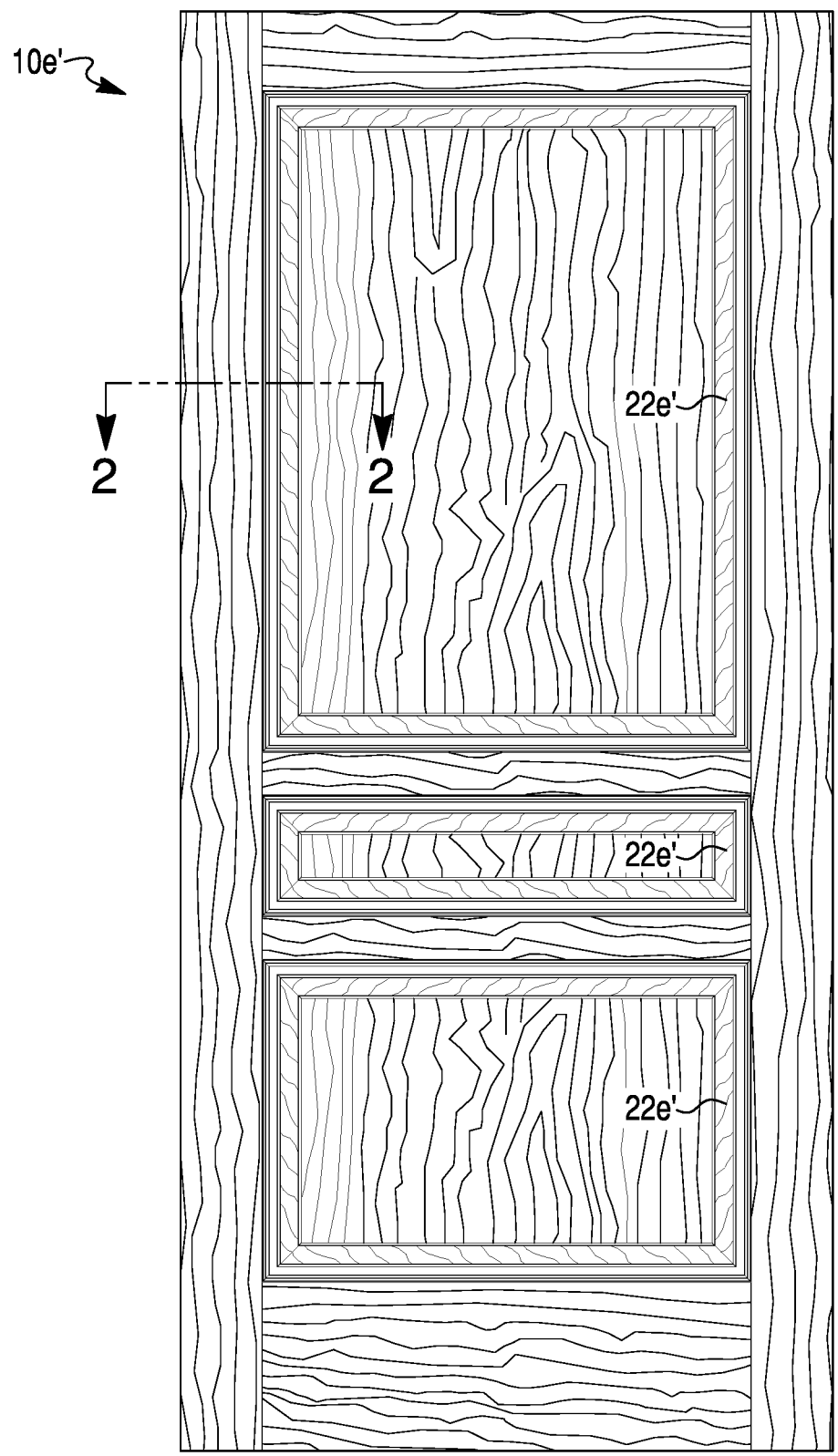
FIG. 23 is a front elevational view of a door skin according to a fifteenth embodiment of the invention having a sectional profile region taken along sectional line 2-2 of FIG. 23 that is identical to the sectional profile region of FIG. 2.
Figure 24:
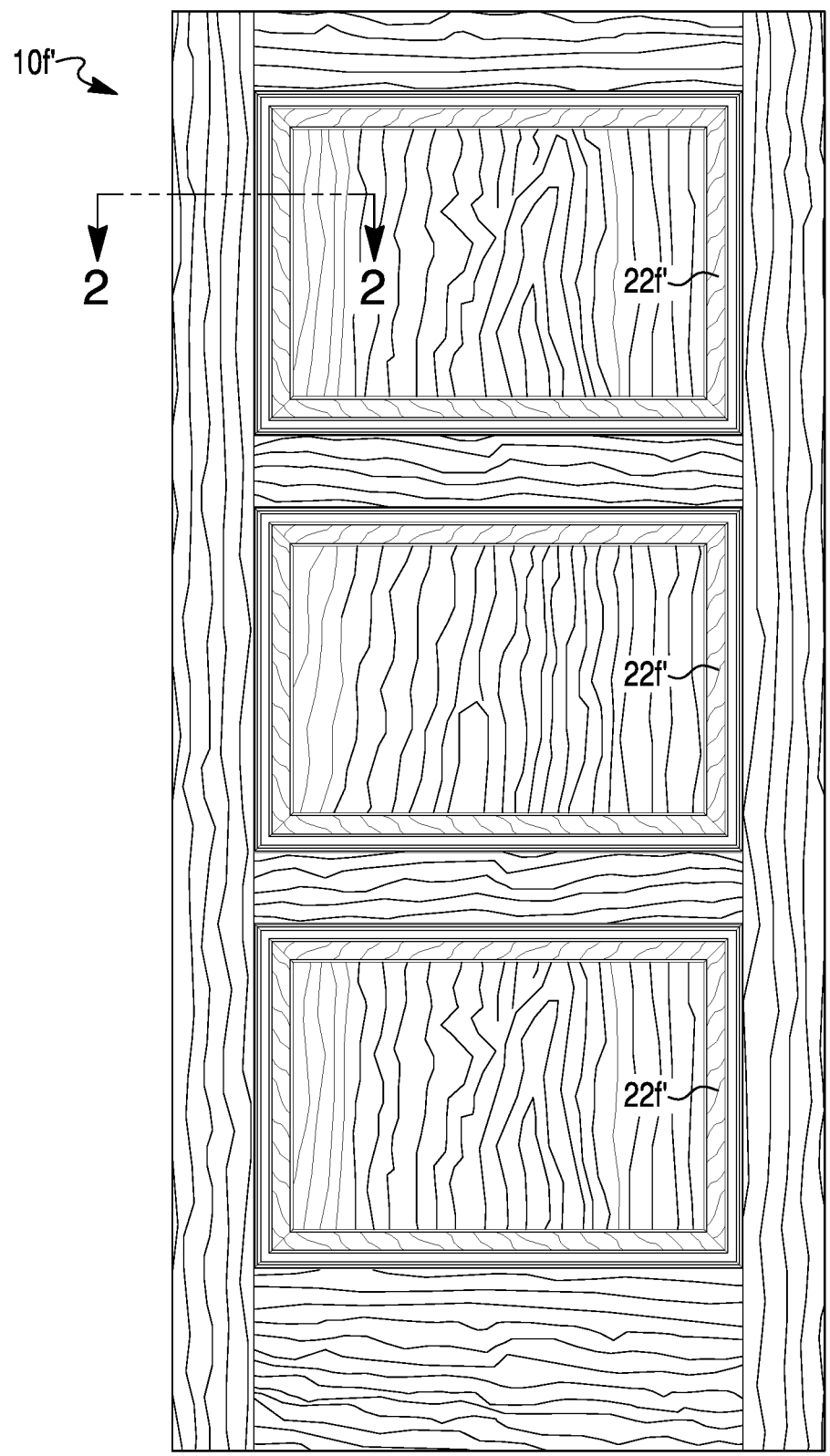
FIG. 24 is a front elevational view of a door skin according to a sixteenth embodiment of the invention having a sectional profile region taken along sectional line 2-2 of FIG. 24 that is identical to the sectional profile region of FIG. 2.
Figure 25:
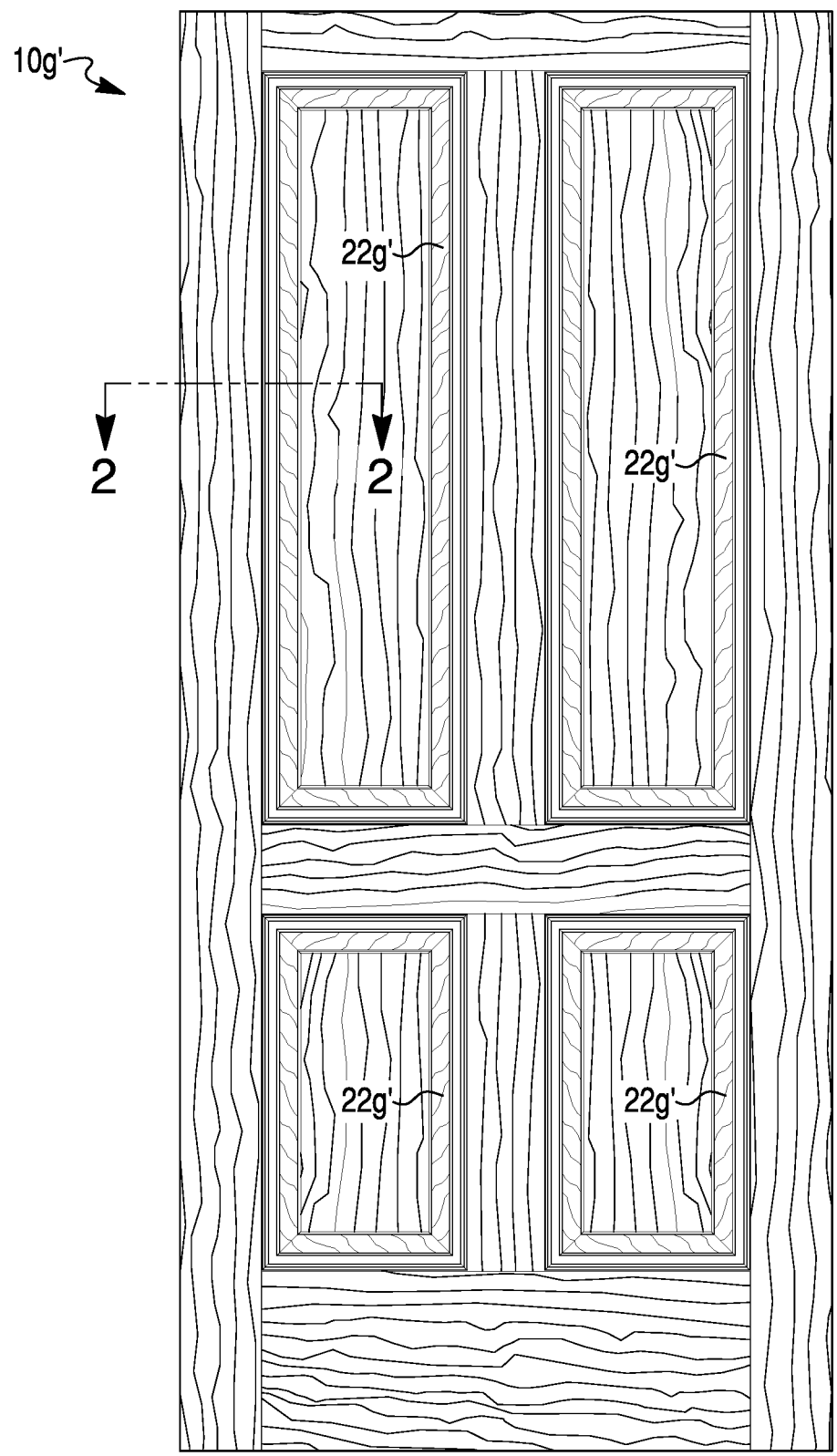
FIG. 25 is a front elevational view of a door skin according to a seventeenth embodiment of the invention having a sectional profile region taken along sectional line 2-2 of FIG. 25 that is identical to the sectional profile region of FIG. 2.
Figure 26:
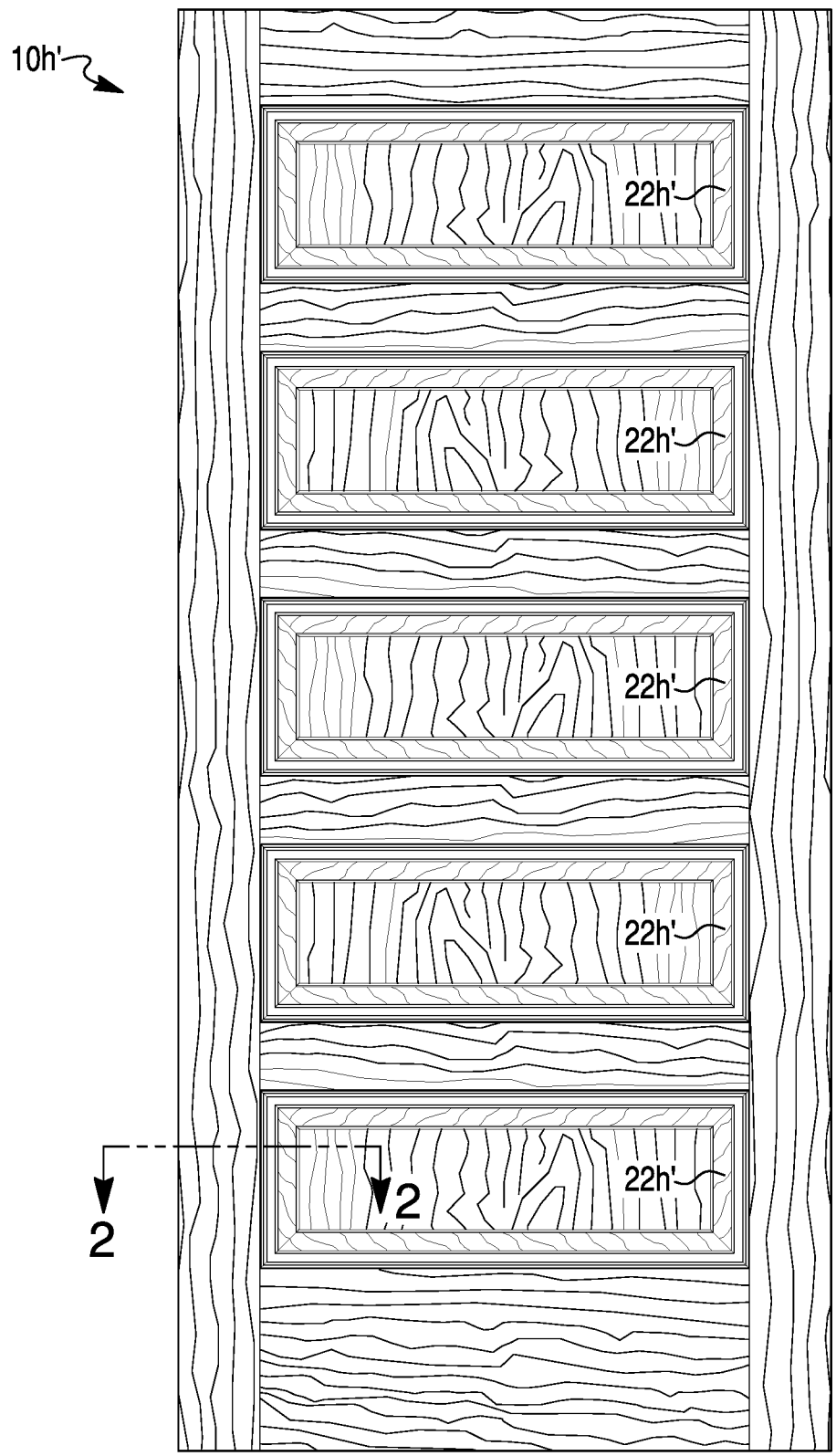
FIG. 26 is a front elevational view of a door skin according to an eighteenth embodiment of the invention having a sectional profile region taken along sectional line 2-2 of FIG. 26 that is identical to the sectional profile region of FIG. 2.

As best shown in FIG. 6, the single contoured portion 22 of the first embodiment has a continuous and uniform rectangular appearance from a front elevational viewpoint.

FIGS. 7-14 illustrate exemplary embodiments of variations and modifications to the design of the door skins 11 and 14 that may be implemented. The encircling contoured portions 22a, 22b, 22c, 22d, 22e, 22f, 22g, and 22h of the door skins 10a, 10b, 10c, 10d, 10e, 10f, 10g, and 10h of each embodiment of FIGS. 7-14 have the same cross-sectional profile region as the contoured portion 22 of door skin 10 shown in FIG. 2.

Figure 27:
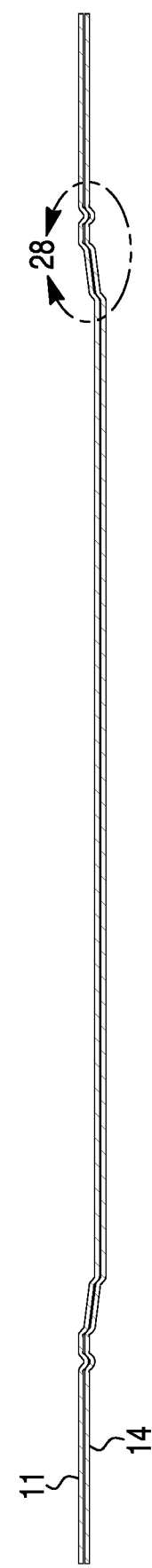
FIG. 27 is a cross-sectional view of a first door skin of the door of FIG. 1 stacked with a second door skin of the door of FIG. 1, the door skins having an identical profile.

Referring now to FIGS. 27 and 28, the first door skin 11 is shown stacked with the second door skin 14, which has an identical profile to the first door skin 11. The second door skin 14 is inverted relative to its orientation in FIGS. 1 and 2. The description of the contours 22 above is incorporated herein by reference. For convenience, the suffix "a" is added to reference numerals associated with the first door skin 11 and the suffix "b" is added to reference numerals associated with the second door skin 14. The first door skin 11 is shown stacked on the second door skin 14, although it should be understood that the second door skin 14 may be stacked on the first door skin 11 in a like manner.

The first door skin 11 includes an outer body portion 24a with the interior surface 13 above and spaced from the exterior surface 15 of an outer body portion 24b of the second door skin 14. The first door skin 11 further includes a substantially V-shaped indent area 26a immediately adjacent to and within or interior relative to the outer body portion 24a. Likewise, the second door skin 14 includes a substantially V-shaped indent area 26b immediately adjacent to and within or interior relative to the outer body portion 24b. The interior surface 13 of the indent area 26a of the first door skin 11 is above and in direct contact with the exterior surface 15 of the indent area 26b of the second door skin 14. The indent area 26a nests on the indent area 26b to space the interior surface 13 of the outer body portion 24a of the first door skin 11 from the interior surface 15 of the outer body portion 24b of the second door skin 14.

The first door skin 11 further includes a planar area 28a immediately adjacent to and within the substantially V-shaped indent area 26a. The planar area 28a is substantially parallel to and coplanar with the outer body portion 24a. The second door skin 14 further includes a planar area 28b immediately adjacent to and within the substantially V-shaped indent area 26b. The planar area 28b is substantially parallel to and coplanar with the outer body portion 24b. The interior surface 13 of the planar area 28a is above and spaced from the exterior surface 15 of the planar area 28b of the second door skin 14 while the skins 11 and 14 are stacked.

A declining or tapering area, generally designated by reference numeral 30a, of the first door skin 11 is immediately adjacent to and within the planar area 28a. The declining area 30a has three angled zones 32a, 34a, and 36a interconnected to one another, with the outer and inner angled zones 32a and 36a declining or tapering at a greater rate than the intermediate angled zone 34a therebetween. A declining or tapering area 30b of the second door skin 14 is immediately adjacent to and within the planar area 28b. The declining area 30b has three angled zones 32b, 34b, and 36b interconnected to one another, with the outer and inner angled zones 32b and 36b declining or tapering at a greater rate than the intermediate angled zone 34b therebetween. The interior surface 13 of the angled zones 32a and 36a are above and in direct contact with the exterior surface 14 of the angled zones 32b and 36b, respectively. The angled zones 32a and 36a nest on the angled zones 32b and 36b. The interior surface 13 of the angled zone 34a is above and spaced from the exterior surface 14 of the angled zone 34b.

An inner panel 20a is located at an opposite end of the declining or tapering area 30a. Similarly, an inner panel 20b is located at an opposite end of the declining or tapering area 30b. The interior surface 13 of the inner panel 20a is above and spaced from the exterior surface 14 of the inner panel 20b.

Although FIGS. 27 and 28 show two stacked door skins 11 and 14, it should be understood that three, four, five, six, or more (e.g., one hundred) door skins may be stacked with one another. Further, the different door designs described below, including in connection with FIGS. 7-26, may be stacked in a similar manner.

The nestable/stackable door skins 11, 14 allow for stacking of multiple door skins with one another, such as for shipping and storage, without the need for spacers. Preferably, nesting contact is limited to the relatively narrow angular portions 26a/26b, 32a/32b, and 36a/36b, so that surface texture of the exterior surface of the larger area inner panels 20a/20b and the outer body portions 24a/24b are not adversely affected, such as by the movement of door skins 11 and 14 relative to one another during processing and shipping.

Also, the first and second door skins 11 and 14 may have thicknesses that vary over their lengths. For example, as best shown in FIG. 28, the first door skin 11 has a reduced thickness at the intersection of the outer body portion 24a and the substantially V-shaped indent area 26a, at the intersection of the substantially V-shaped indent area 26a and the planar area 28a, at the intersection of the planar area 28a and the angled zone 32a, and at the intersection of the angled zones 34a and 36a. These reduced-thickness zones may be established by providing recesses at the intersections, particularly at the interior surfaces 13 and 16 of the door skins 11 and 14. For example, for compression molded door skins, the recesses may be made by shaping the mold die surfaces to control caliper (or mold cavity thickness) so that the caliper is reduced at the aforementioned intersections. The second door skin 14 has similar reduced thickness zones at its intersections 24b/26b, 26b/28b, 28b/32b, and 34b/36b. Those skilled in the art recognize that as thickness decreases, density increases and thus control of thickness must take into account the density of the door skins 11, 14. The external surface of each door skin 11, 14 should be sufficiently hard (dense) in order to withstand impact, such as from contact with an article, etc.

While FIG. 6 illustrates an embodiment of a door skin 11 with one inner panel 20, the number of inner panels 20 may be varied. For example, the door skins 11 and 14 may have two inner panels with two contoured portions (e.g., the embodiments of FIGS. 7-9), three inner panels with three contoured portions (e.g., the embodiments of FIGS. 10-12), four inner panels with four contoured portions (e.g., the embodiment of FIG. 13), five inner panels with five contoured portions (e.g., the embodiment of FIG. 14), or more inner panels and associated contoured portions. The inner panels 20 may be arranged in vertically stacked configurations (e.g., the inner panels of the embodiments of FIGS. 7-9, 11, 12, and 14), side-by-side juxtaposed configurations, or a combination of vertically stacked and side-by-side juxtaposed configurations (e.g., the inner panels of the embodiments of FIGS. 10 and 13). The perimeters of the inner panels may establish other shapes, such as other polygons, circles, ovals, etc. The inner panels may have the same shapes (e.g., the inner panels of FIGS. 12 and 14) or different shapes (e.g., the inner panels of FIGS. 7-11 and 13) and/or dimensions from one another.

The door skins 11 and 14 may have an identical or different arrangement of inner panels and other surface features (e.g., embossed wood grain) on their respective exterior surfaces 12 and 15. FIGS. 15-18 illustrates a door 10' that is identical to door 10 of FIGS. 3-6, except for the addition of a wood grain pattern in the exterior surface of the door skins. The door 10' includes a first door skin 11' and a second door skin (not shown in FIGS. 15-18 but identical to the second door skin 14 but with a wood grain pattern added). The first door skin 11' has a first exterior surface and an opposite first interior surface. Likewise, the second door skin has a second exterior surface and an opposite second interior surface. The first and second door skins of the embodiment of FIGS. 15-18 are each a one-panel skin having an inner panel 20', an outer body portion or outer skirt 24' surrounding the inner panel 20', and a contoured portion or ovalo 22' interconnecting and integrally formed as a unitary piece with the inner panel 20' and the outer body portion 24'. When viewed from the exterior side of the door skin 11', the contoured portion 22' defines a continuous depression extending into the planar portions of the exterior surface toward the door core. The contoured portion 22' has a sectional profile taken along sectional lines 1-1 and 2-2 of FIG. 18 that is identical to the sectional profile of FIGS. 1 and 2.

FIGS. 19-26 illustrate doors 10a', 10b', 10c', 10d', 10e', 10f', 10g', and 10h', respectively, having door skins including panel arrangements with encircling contoured portions 22a', 22b', 22c', 22d', 22e', 22f', 22g', and 22h', that are identical to FIGS. 7-14, respectively, except that the exterior surfaces of the door skin of the doors 10a', 10b', 10c', 10d', 10e', 10f', 10g', and 10h' of FIGS. 19-26 are provided with wood grain patterns. Those skilled in the art will understand that the wood grain pattern may be applied or formed also with the profile portions 22a', 22b', 22c', 22d', 22e', 22f', 22g', and 22h'.

The door skins with woodgrain exterior surfaces of FIGS. 15-26 can be stacked and nested with one another in the same manner described above in connection with FIGS. 27 and 28. The woodgrain embossing or molding does not adversely affect nesting.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to necessarily limit the invention to the precise embodiments disclosed.

What is claimed is:

1. A stack of door skins, comprising:
 a first door skin comprising
 a first outer body portion;
 at least one first inner panel extending between and terminating at a first continuous planar outer perimeter, an entirety of the first inner panel within the first continuous planar outer perimeter being parallel to and recessed from the first outer body portion, the first inner panel being recessed from the first outer body portion in a first declining direction; and
 at least one first contoured portion surrounding the at least one first inner panel and interconnecting the at least one first inner panel to the first outer body portion, the at least one first contoured portion comprising
 a first V-shaped indent area surrounded by the first outer body portion,
 a first planar area that is parallel to the first outer body portion, and is surrounded by the first V-shaped indent area, and
 a first declining area sloped in the first declining direction surrounded by the first planar area and terminating at the first continuous planar outer perimeter of the first inner panel; and
 a second door skin with an identical profile to and stacked on the first door skin, the second door skin comprising
 a second outer body portion;
 at least one second inner panel extending between and terminating at a second continuous planar outer perimeter, an entirety of the second inner panel within the second continuous planar outer perimeter being parallel to and recessed from the second outer body portion, the second inner panel being recessed from the second outer body portion in a second declining direction; and
 at least one second contoured portion surrounding the at least one second inner panel and interconnecting the at least one second inner panel to the second outer body portion, the at least one second contoured portion comprising
 a second V-shaped indent area surrounded by the second outer body portion,
 a second planar area that is parallel to the second outer body portion, and surrounded by the second V-shaped indent area, and
 a second declining area sloped in the second declining direction surrounded by the second planar area and terminating at the second continuous planar outer perimeter of the second inner panel.

2. The stack of door skins of claim 1, wherein the first planar area is coplanar with the first outer body portion, and the second planar area is coplanar with the second outer body portion.

3. The stack of door skins of claim 1, wherein the first inner panel is continuous and flat and positioned centermost relative to the first contoured portion, and wherein the second inner panel is continuous and flat and positioned centermost relative to the second contoured portion.

4. The stack of door skins of claim 1, wherein the first and second door skins comprise a wood composite composition.

5. The stack of door skins of claim 1, wherein the first and second door skins comprise a fiberglass-reinforced polymer.

6. The stack of door skins of claim 1, wherein the at least one first contoured portion is formed as a unitary piece with the at least one inner first panel and the first outer body portion, and wherein the at least one second contoured portion is formed as a unitary piece with the at least one inner second panel and the second outer body portion.

7. A stack of door skins, comprising:
 a first door skin comprising
 a first outer body portion;
 at least one first inner panel extending between and terminating at a first continuous planar outer perimeter, an entirety of the first inner panel within the first continuous planar outer perimeter being parallel to and recessed from the first outer body portion, the first inner panel being recessed from the first outer body portion in a first declining direction; and
 at least one first contoured portion surrounding the at least one first inner panel and interconnecting the at least one first inner panel to the first outer body portion, the at least one first contoured portion comprising
 a first V-shaped indent area surrounded by the first outer body portion,
 a first planar area that is parallel to the first outer body portion, and is surrounded by the first V-shaped indent area, and
 a first declining area sloped in the first declining direction surrounded by the first planar area and terminating at the first continuous planar outer perimeter of the first inner panel; and
a second door skin with an identical profile to and stacked on the first door skin, the second door skin comprising
 a second outer body portion spaced from the first outer body portion;
 at least one second inner panel extending between and terminating at a second continuous planar outer perimeter, an entirety of the second inner panel within the second continuous planar outer perimeter being parallel to and recessed from the second outer body portion, the second inner panel being recessed from the second outer body portion in a second declining direction, the second inner panel being spaced from the first inner panel; and
 at least one second contoured portion surrounding the at least one second inner panel and interconnecting the at least one second inner panel to the second outer body portion, the at least one second contoured portion comprising
  a second V-shaped indent area surrounded by the second outer body portion, the second V-shaped indent area nesting in contact with the first V-shaped indent area;
  a second planar area that is parallel to the second outer body portion, and surrounded by the second V-shaped indent area, the second planar area being spaced from the first planar area, and
  a second declining area sloped in the second declining direction surrounded by the second planar area and terminating at the second continuous planar outer perimeter of the second inner panel, the second declining area nesting in contact with the first declining area.

8. The stack of door skins of claim 7, wherein the first planar area is coplanar with the first outer body portion, and the second planar area is coplanar with the second outer body portion.

9. The stack of door skins of claim 7, wherein the first inner panel is continuous and flat and positioned centermost relative to the first contoured portion, and wherein the second inner panel is continuous and flat and positioned centermost relative to the second contoured portion.

10. The stack of door skins of claim 7, wherein the first and second door skins comprise a wood composite composition.

11. The stack of door skins of claim 7, wherein the first and second door skins comprise a fiberglass-reinforced polymer.

12. The stack of door skins of claim 7, wherein the at least one first contoured portion is formed as a unitary piece with the at least one inner first panel and the first outer body portion, and wherein the at least one second contoured portion is formed as a unitary piece with the at least one inner second panel and the second outer body portion.

13. A stack of door skins, comprising:
a first door skin comprising
 a first outer body portion;
 at least one first inner panel extending between and terminating at a first continuous planar outer perimeter, an entirety of the first inner panel within the first continuous planar outer perimeter being parallel to and recessed from the first outer body portion, the first inner panel being recessed from the first outer body portion in a first declining direction; and
 at least one first contoured portion surrounding the at least one first inner panel and interconnecting the at least one first inner panel to the first outer body portion, the at least one first contoured portion comprising
  a first V-shaped indent area surrounded by the first outer body portion,
  a first planar area that is parallel to the first outer body portion, and is surrounded by the first V-shaped indent area, and
  a first declining area sloped in the first declining direction surrounded by the first planar area and terminating at the first continuous planar outer perimeter of the first inner panel; and
a second door skin with an identical profile to and stacked on the first door skin, the second door skin comprising
 a second outer body portion;
 at least one second inner panel extending between and terminating at a second continuous planar outer perimeter, an entirety of the second inner panel within the second continuous planar outer perimeter being parallel to and recessed from the second outer body portion, the second inner panel being recessed from the second outer body portion in a second declining direction; and
 at least one second contoured portion surrounding the at least one second inner panel and interconnecting the at least one second inner panel to the second outer body portion, the at least one second contoured portion comprising
  a second V-shaped indent area surrounded by the second outer body portion,
  a second planar area that is parallel to the second outer body portion, and surrounded by the second V-shaped indent area, and
  a second declining area sloped in the second declining direction surrounded by the second planar area and terminating at the second continuous planar outer perimeter of the second inner panel,
the first and second declining areas each comprising first and second planar declining angled zones and an intermediate third planar declining angled zone between the first and second planar declining angled zones.

14. The door skin of claim 13, wherein:
the first and second planar declining angled zones of the first and second door skins nest in contact with one another;
the first V-shaped indent area nests in contact with the second V-shaped indent area; and
the first outer body portion, the first planar area, and the first inner panel are spaced from the second outer body portion, the second planar area, and the second inner panel, respectively.

15. The stack of door skins of claim 14, wherein the first and second planar declining angled zones decline at a greater rate than the intermediate planar declining angled zone.

16. The stack of door skins of claim 14, wherein the first planar area is coplanar with the first outer body portion, and the second planar area is coplanar with the second outer body portion.

17. The stack of door skins of claim 14, wherein the first inner panel is continuous and flat and positioned centermost relative to the first contoured portion, and wherein the second inner panel is continuous and flat and positioned centermost relative to the second contoured portion.

18. The stack of door skins of claim 14, wherein the first and second door skins comprise a wood composite composition.

19. The stack of door skins of claim 14, wherein the first and second door skins comprise a fiberglass-reinforced polymer.

20. The stack of door skins of claim 14, wherein the at least one first contoured portion is formed as a unitary piece with the at least one inner first panel and the first outer body portion, and wherein the at least one second contoured portion is formed as a unitary piece with the at least one inner second panel and the second outer body portion.

\* \* \* \* \*